United States Patent [19]

Wagner et al.

[11] Patent Number: 5,434,928
[45] Date of Patent: Jul. 18, 1995

[54] METHOD FOR VERIFYING A HANDWRITTEN SIGNATURE ENTERED INTO A DIGITIZER

[75] Inventors: Samuel J. Wagner, Lilburn; Clifton F. Moore, Jr., Buford, both of Ga.

[73] Assignee: AT&T Global Information Solutions Company, Dayton, Ohio

[21] Appl. No.: 163,469

[22] Filed: Dec. 6, 1993

[51] Int. Cl.$^6$ ............................................. G06K 9/00
[52] U.S. Cl. ...................................... 382/187; 382/119
[58] Field of Search ................... 382/3, 13, 30, 34, 48; 902/6, 25; 235/380; G06K 9/00, 9/62, 9/68, 9/20, 19/00, 5/00; H04N 7/18

[56] References Cited

U.S. PATENT DOCUMENTS

| | | | |
|---|---|---|---|
| 3,111,646 | 11/1963 | Harmon et al. | 382/13 |
| 4,040,010 | 8/1977 | Crane et al. | 340/146.3 |
| 4,495,644 | 1/1985 | Parks et al. | 382/3 |
| 4,680,801 | 7/1987 | Etherington et al. | 382/3 |
| 4,736,445 | 4/1988 | Gundersen | 382/3 |
| 4,751,741 | 1/1988 | Mochinaga et al. | 382/13 |
| 4,817,034 | 3/1989 | Hardin, Sr. et al. | 364/900 |
| 4,897,880 | 1/1990 | Wilber et al. | 382/13 |
| 4,901,358 | 2/1990 | Bechet | 382/3 |
| 4,933,977 | 6/1990 | Ohnishi et al. | 382/13 |
| 5,040,222 | 8/1991 | Muroya | 382/3 |
| 5,054,088 | 10/1991 | Gunderson et al. | 382/340 |
| 5,109,426 | 4/1992 | Parks | 382/2 |
| 5,113,452 | 5/1992 | Chatani et al. | 382/13 |
| 5,327,342 | 7/1994 | Roy | 382/13 |

*Primary Examiner*—Jose L. Couso
*Attorney, Agent, or Firm*—Paul W. Martin

[57] ABSTRACT

A handwriting verification method which is less expensive to implement than previous methods, employs simpler algorithms than previous methods, and which requires fewer points than previous methods. The method includes the steps of determining a set of positional data points for a handwritten signature entered into the digitizer, determining a set of global variable values associated with the signature from the positional data points, determining head and tail strings having shape information for the signature, reading previously computed head and tail strings from a storage medium carried by the person, reading the verification information from the storage medium, determining a range of acceptance values for each global variable, and determining whether each of the global verification values lies within the range of acceptance. If at least one of the global verification values lies outside the range of acceptance, the method further includes the step of rejecting the subsequent signature as a forgery. If each of the global verification values lies within the range of acceptance, the method further includes the step of determining whether the head and tail strings of the subsequent signature equal the head and tail strings from the storage medium. If either of the head and tail strings of the subsequent signature are not equal to the head and tail strings from the storage medium, the method further includes the step of rejecting the subsequent signature as a forgery. Finally, if both the head and tail strings of the subsequent signature are equal to the head and tail strings from the storage medium, the method includes the step of accepting the signature as valid.

5 Claims, 23 Drawing Sheets

METHOD FOR VERIFYING A HANDWRITTEN SIGNATURE ENTERED INTO A DIGITIZER

CROSS REFERENCE TO RELATED APPLICATIONS

The present invention is related to the following commonly assigned U.S. applications:

"Write Input Transaction Apparatus and Method", filed Aug. 30, 1990, invented by Allgeier et al., and having a Ser. No. 07/575,096 pending.

"Method of Recording a Handwritten Signature", invented by Crooks et al and having a Ser. No. 07/693,822 which issued and is now U.S. Pat. No. 5,285,506; and "Method for Recording Compressed Data", invented by Wagner et al., and having a Ser. No. 07/866,613 pending.

BACKGROUND OF THE INVENTION

The present invention relates to handwriting capture devices, and more specifically to a method for verifying a handwritten signature entered into a digitizer.

The method of the present invention has particular application in conjunction with the method disclosed in the co-pending application by Crooks et al., in which a handwritten signature is captured at a point of sale, compressed, and stored for later use to authenticate the transaction. Strokewise data compression is accomplished by examining the coordinate data on a sequential basis in accordance with the ordered storage arrangement thereof. A digital computing device progressively selects start points and stop points and examines the coordinates of all midpoints situated therebetween, where midpoints are defined as points located in time between the start and stop points. The computing device establishes guidelines between the start points and their associated stop points and selectively saves the coordinate data only for those midpoints which are not situated at predetermined locations relative to their associated guidelines. Midpoints which are situated at predetermined locations are considered to be redundant and are discarded.

The preferred method disclosed by Crooks et al. for saving and discarding data is a linear fit criterion. A straight line is established between each start point and the successively established stop points. The equation of the straight line between the start point and the stop point is calculated in terms of a slope and a Y-intercept. For each examined midpoint, the X coordinate thereof is substituted into the equation for the line, and the line equation is solved to determine a Y value. The calculation is performed using floating point arithmetic, and the result is converted to an integer. If the resulting integer value of Y is within a predetermined limit of the Y coordinate of the point being examined, based upon the amount of scaling provided, then the rejection criterion is satisfied. The scaling factor represents a desired reduction in resolution for the resulting data and provides an inherent threshold for accepting or rejecting midpoints.

Crooks et al. disclose an alternative embodiment which utilizes a rejection criterion which is based upon a calculated perpendicular distance between a midpoint under examination and a straight line between the start point and the stop point. The calculated distance is compared with a predetermined threshold distance to either accept or reject the midpoint.

The method of the present invention also builds upon the method for recording compressed data disclosed by Wagner et al. The method includes a perpendicular test as well as a parallel test for discarding handwritten data points relative to a series of guide lines. The parallel test determines whether a data point lies at a true distance within a predetermined threshold distance either side of the guide line. The perpendicular test determines whether the data point lies between two perpendicular lines through the end points of the guideline. Both tests must be satisfied before a data point is discarded. Floating point arithmetic, with its inherent inaccuracy and its associated excessive processor cycles, is avoided by using integer scaling and a predetermined parallel threshold value. To further reduce the compressed signature size, the x and y delta values, which are used to denote points within a stroke, are shortened. Error is maintained at a predetermined limit by adjusting the delta values prior to storage.

Merchandising systems used in conjunction with the method described in the above-mentioned patent applications may be equipped with a transparent glass screen having a resistive coating fused to its surface. A linearized voltage field is established on the surface of the screen. A human signature is captured by providing a hand-held stylus which is moved across the surface of the screen during writing of the signature. A digitizer senses the position of the stylus during writing of the signature and generates digital signals representing the X-Y coordinates of the stylus. The digitized coordinates are stored in a memory and are also used to drive a liquid crystal display positioned below the glass screen. This produces a visual display of the signature, as the handwriting progresses. Means are provided for maintaining the signature in registration with the movement of the stylus. An example of such a device is disclosed by Allgeier et al.

Signature capture methods are typically intended to minimize credit card fraud, which is a serious problem for merchants. Credit cards and credit card numbers are easily obtained and exploited to the loss of credit card companies. With the advent of handwriting capture devices, the signature of a credit card user may be captured and verified while a credit transaction is taking place. A reference signature may be obtained from a SMART card through a PIN number or a database through either the SMART card PIN number or credit card account number assigned to the user.

Previous signature verification methods require that all of the digitized signature points and their corresponding timing data be input into the verification system. These methods require expensive digitizers, robust and expensive processors, and large amounts of memory, and they employ slow and complicated algorithms which implement functions requiring many floating point arithmetic operations.

Therefore, it would be desirable to provide a method for processing a handwritten signature which is less expensive to implement than previous methods, employs simpler algorithms than previous methods, and which requires fewer points than previous methods, but which yields a high degree of accuracy.

SUMMARY OF THE INVENTION

In accordance with the teachings of the present invention, a method for verifying a handwritten signature entered into a digitizer is provided. The method includes the steps of storing verification information into a storage medium carried by the person, determining a set of positional data points for a subsequent handwritten signature entered into the digitizer by a person, determining a set of global variable values associated with the subsequent signature from the positional data points by a processor coupled to the digitizer, determining head and tail strings having shape information for the subsequent signature, reading previously computed head and tail strings from a storage medium carried by the person by the processor, reading the verification information from the storage medium by the processor, determining a range of acceptance values for each global variable by the processor, and determining whether each of the global verification values lies within the range of acceptance. If at least one of the global verification values lies outside the range of acceptance, the method further includes the step of rejecting the subsequent signature as a forgery. If each of the global verification values lies within the range of acceptance, the method further includes the step of determining whether the head and tail strings of the subsequent signature equal the head and tail strings from the storage medium. If either of the head and tail strings of the subsequent signature are not equal to the head and tail strings from the storage medium, the method further includes the step of rejecting the subsequent signature as a forgery. Finally, if both the head and tail strings of the subsequent signature are equal to the head and tail strings from the storage medium, the method includes the step of accepting the signature as a valid.

The compression and storage method disclosed in the co-pending patent application by Wagner et. al. is extended to include two timing fields used in the verification process: total pen down time and total pen time. Both of these times preferably denote the number of 5 ms ticks. The verification method of the present invention is unique because only the points left after the compressed-packed, write-capture method are required, and because the timing data for each point is not needed. Finally, the verification model is unique because it can be made to be dynamic without storing all the values needed to compute the respective means and standard deviations for its global variables. This is done by deriving a standard deviation formula that requires only the sum of the variable values and the sum of the variable values squared and using a statistical method that enables a good candidate variable value to be selected at random as the one that should leave the model once another signature is signed.

The method of the present invention is highly efficient with respect to speed and amount of secondary storage required. It is a feature of the present invention that only about 20% of the original signature points are required. Thus, only about 210 bytes of space in a storage medium are required. This allows the compressed-packed signature of 210 bytes or less to be archived, and then later retrieved either for printing or reverification.

It is accordingly an object of the present invention to provide a method for verifying a handwritten signature entered into a digitizer.

It is another object of the present invention to provide a method for verifying a handwritten signature which employs compression and packing to minimize the number of points required for storing archived signatures.

It is another object of the present invention to provide a method for verifying a handwritten signature which is less expensive to implement than previous methods, employs simpler algorithms than previous methods, and which requires fewer points than previous methods, but which yields a high degree of accuracy.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
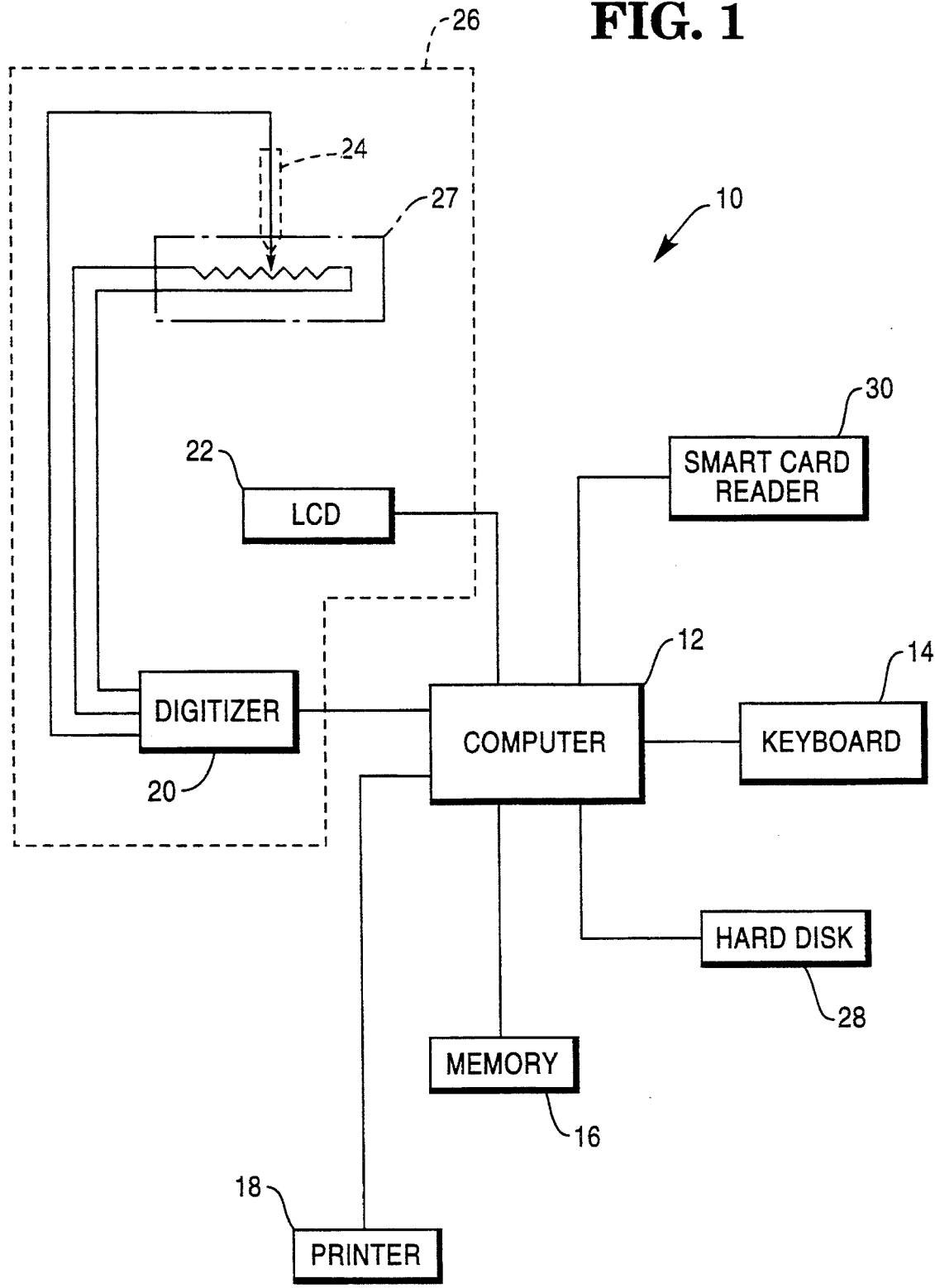
FIG. 1 is a block diagram of a signature recording system.

Referring now to FIG. 1, system 10 may include computer 12, keyboard 14, memory 16, printer 18, digitizer 20, liquid crystal display (LCD) 22, stylus 24, write-capture device 26, fixed disk 28, and a Smart Card Reader 30.

In the preferred embodiment of the invention digitizer 20 is a Scriptel Model 1212. Digitizer 20 captures stylus positional information for a series of discrete points at regularly timed intervals. These time intervals are short enough to capture a high-quality record of a fast-moving handwritten input. A digitizer of the above mentioned type is capable of capturing a rapidly written signature at a resolution of 1,000 dots per inch (dpi). However, a resolution of only about 75 dpi is satisfactory for many signature recording requirements, and therefore the system may generate redundant data. The amount of such redundant data will be increased if the handwriting proceeds at a slow pace.

The serial data generated by a digitizer of the above-mentioned type is organized into 7-byte messages, each representing a single position/status report for the stylus.

Digitizer 20 includes glass screen 27. A resistive coating is fused upon the surface of glass screen 27 and a linearized voltage field is applied thereto. Digitizer 20 senses the position of the stylus tip relative to screen 27 and generates a corresponding sequence of digital data bytes. These data bytes carry the 8-bit binary codes representing the X-Y coordinates for a series of sequentially-written signature points; each signature point being displaced from its neighbors along a line running in the strokewise direction (i.e., in the direction of the path traveled by the stylus).

Stylus 24 may be grasped by a human participant and brought into contact with glass screen 27. Stylus 24 is held in contact with glass screen 27 while the human participant makes a handwritten signature.

LCD 22 is positioned below the surface of digitizer screen 27. Screen 27 is transparent, so that a display presented by LCD 22 may be observed therethrough. Positional coordinate information from digitizer 20 is applied to LCD 22 for creating a visual image of the progressively written signature. The signature coordinate information is also stored in a suitable digital memory 16 for further processing as described in detail below, where:

X0–X15 form the x-position coordinate value. X15 is the most significant bit, while X0 is the least significant bit.

Y0–Y15 form the y-position coordinate value. Y15 is the most significant bit, while Y0 is the least significant bit.

SGN is the sign of the value which follows. SGN=0 indicates a positive value while SGN=1 indicates a negative value.

PA is a flag bit which indicates what type of input device is being used with the digitizer (puck, stylus, etc.). It is equal to 0 when a stylus is being used.

PB2, PB4, and PB8 are not used for the stylus input device.

PB1 indicates the state of the stylus tip switch. When the stylus is pressed against the digitizer tablet, PB1=1. When the stylus is not pressed against the digitizer tablet, PB1=0.

ST1 and ST2 are proximity flags. When the stylus is close enough to the digitizer pad to sense stylus position, ST1=ST2=0. When the stylus is too far away from the pad to sense stylus position, ST1=ST2=1.

Computer 12 receives stylus position and status information via a serial RS232 link. Computer 12 may be an NCR PC810 personal computer, but other personal computers may be used. Computer 12 generates image control signals for LCD 22 and print control signals for printer 18.

Keyboard 14 supplies transaction information to computer 12.

Memory 16 provides a storage medium for signature data which remains after redundant signature data is discarded.

Fixed disk 28 is used to store compressed-packed signatures.

Smart Card 30 is used to store the verification model of a person's signature. When the card is used the first time, the individual signs several times in order that the initial model can be stored electronically on the Smart Card. Thereafter, if the signature is accepted as genuine, the model is updated. If the signature is not accepted, then the signer can retry several times. If still unsuccessful, the transaction can be manually accepted, but the model is not updated in this instance.

Figure 2A:
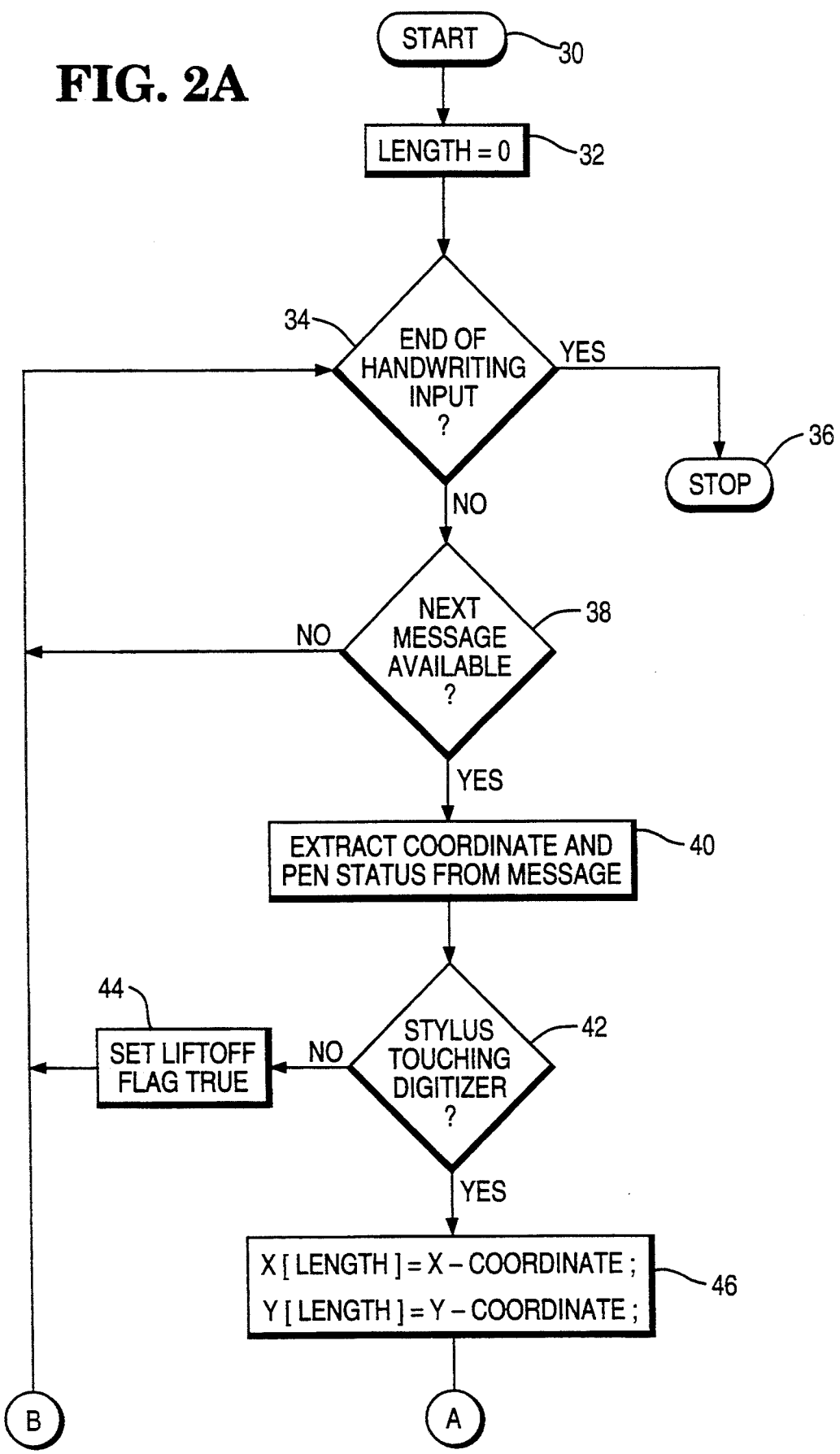
FIGS. 2A and 2B are a flowchart of a digital computer routine for capturing positional coordinates for a handwritten signature.
Figure 2B:
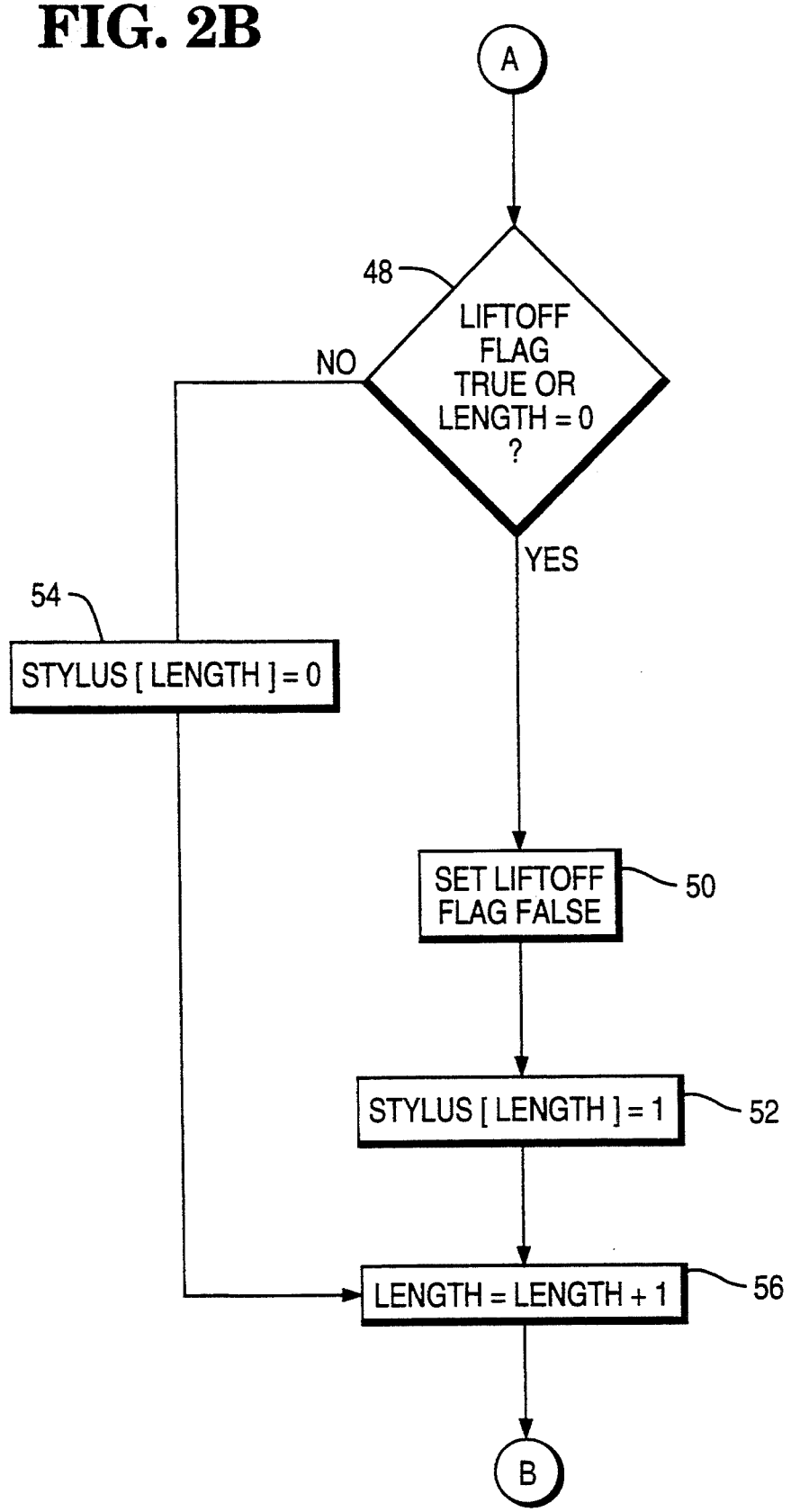

As shown in FIGS. 2A and 2B, the X-Y coordinates of the signature points may be captured using the method disclosed by Crooks et al. Such a method may store the digitizer data in three arrays as follows:

"x[n]"—the horizontal position or x-coordinate of a data point.

"y[n]"—the vertical position or y-coordinate of a data point.

"stylus[n]"—stroke information. "stylus[n]=0 indicates that point n is part of a continuing stroke; that is, the stylus was in contact with the digitizer surface at point n−1. "stylus[n]=1 indicates that point n is at the beginning of a new stroke.

The value of the variable n begins at 0 and is incremented for each new data point. The program uses an integer known as "length" which has an initial value of 0 and which progressively increases until it reaches a value equal to the highest value of n plus 1. Thus, "length" takes on a value equal to the total number of data points. Each of the above-mentioned arrays contains data for "length" points after completion of the sequence illustrated in FIGS. 2A and 2B. It is common programming practice to assign the value 0 to the first element of an array, so the index value for the last element of each array is equal to length−1.

Referring again to the flowchart of FIGS. 2A and 2B, execution starts at block 30 and then continues to block 32 where the variable "length" is initialized at a value of 0. This value is incremented as each new data point is read.

In block 34, the program performs a keyboard scan to detect a keystroke indicating that the handwritten input is complete. If the input is complete, then the program exits to point 36. The value of "length" at that point in time is stored in memory as a constant.

If the handwriting input is not complete, then the program progresses to block 38 to determine whether the next message is available. If a complete message is not yet available, execution proceeds back to block 34 until a message is available.

If the next message is available, the program continues to block 40 where x and y coordinates, as well as stylus status information, are extracted from the complete message via conventional bit manipulation. Reference may be made to Table I for guidance in the preparation of an appropriate bit manipulation routine:

TABLE I

| Byte | bit 7 | bit 6 | bit 5 | bit 4 | bit 3 | bit 2 | bit 1 | bit 0 |
|---|---|---|---|---|---|---|---|---|
| 1 | 1 | ST1 | ST2 | PA | PB8 | PB4 | PB2 | PB1 |
| 2 | 0 | 0 | 0 | 0 | 0 | SGN | X15 | X14 |
| 3 | 0 | X13 | X12 | X11 | X10 | X9 | X8 | X7 |
| 4 | 0 | X6 | X5 | X4 | X3 | X2 | X1 | X0 |
| 5 | 0 | 0 | 0 | 0 | 0 | SGN | Y15 | Y14 |
| 6 | 0 | Y13 | Y12 | Y11 | Y10 | Y9 | Y8 | Y7 |
| 7 | 0 | Y6 | Y5 | Y4 | Y3 | Y2 | Y1 | Y0 |

Following extraction of coordinate data and stylus status information from the message, the program continues to block 42 where the BP1 bit of the current message is examined to determine whether the stylus is pressed against the digitizer tablet. If not, a flag known as the liftoff flag is set "true" in block 44 and the program returns to block 34.

If the stylus is found to be touching the digitizer, then execution proceeds to block 46, where the x and y coordinate values are stored in the x and y arrays at index locations indicated by the current value of "length".

In block 48, an inquiry is made to determine whether the liftoff flag is set to a logical "true" OR if "length" is equal to 0. If either condition is true, execution continues to block 50, where the liftoff flag is set to a logical "false". Execution continues to block 52, where a "1" is stored in the "stylus[]" array at position "length".

If neither the liftoff flag is set to a logical "true" nor is "length" equal to 0, then "stylus[length]" is set equal to 0 in block 54. Then, in block 56, "length" is incremented. Finally, execution returns to block 34.

After completing the procedure illustrated by the flowchart of FIGS. 2A and 2B, the method of Crooks et al. continues by compressing the data stored in arrays x[n], y[n] and stylus[n]. Compression proceeds on a strokewise basis, so that the data stored in the above-noted arrays is examined in the order in which it was stored. It will be appreciated that the stored data files may be examined in a reversed order or on a piecewise basis, either of which are equivalent to examination from beginning to end. All such equivalent examination sequences are referred to herein by the term "strokewise".

Compression involves two general phases, the first of which is a scaling phase. In this connection the program uses a variable "old_res" to refer to the resolution of the data as initially captured. Thus each count in x[n] and y[n] represents a distance of 1/old_res from the origin. The location of the origin is unimportant so long as all points are specified with reference to the same origin. A common point for the origin is the center of the digitizer panel, and old_res is determined by the digitizer pad used. For example, if the digitizer has a resolution of 1,000 dpi, each count in x[n] and y[n] initially represents a distance of 0.001 inches. A value of x[n] equal to 500 therefore represents a horizontal distance of 0.5 inches from the origin, and a value of 250 for y[n] represents a vertical distance of 0.25 inches from the origin.

Referring now to FIGS. 3A through 3E, a compression procedure is shown which may be used with the verification procedure of the present invention. Variables used in this procedure are as follows:

"x[]" and "y[]" are arrays of length "length" which contain the horizontal and vertical coordinates respectively of each point in the handwriting record, as described previously. After compression, these arrays contain the horizontal and vertical coordinates of the compressed handwriting record.

"stylus[]" is an array of length "length" which contains the action of the stylus at the point specified by x[n] and y[n], as described previously. After compression, this array contains the stylus action for each point in the compressed handwriting record.

"length" represents the number of elements in the handwriting records, as described previously.

"new_res" is the handwriting record resolution after compression has been applied.

"old_res" is the handwriting record resolution before compression has been applied.

"new" is an array index which points to the next open position in either "x[]", "y[]", or "stylus[]" after the last point in the new, compressed handwriting record. For example, "x[new−1]" is the last x-coordinate in the handwriting record after compression. "new" is also equal to the length of the compressed handwriting record.

"start" is an array index used during compression.

"midpoint" is an array index used during compression.

"stop" is an array index used during compression.

"n" is an array index used during compressing.

Figure 3A:
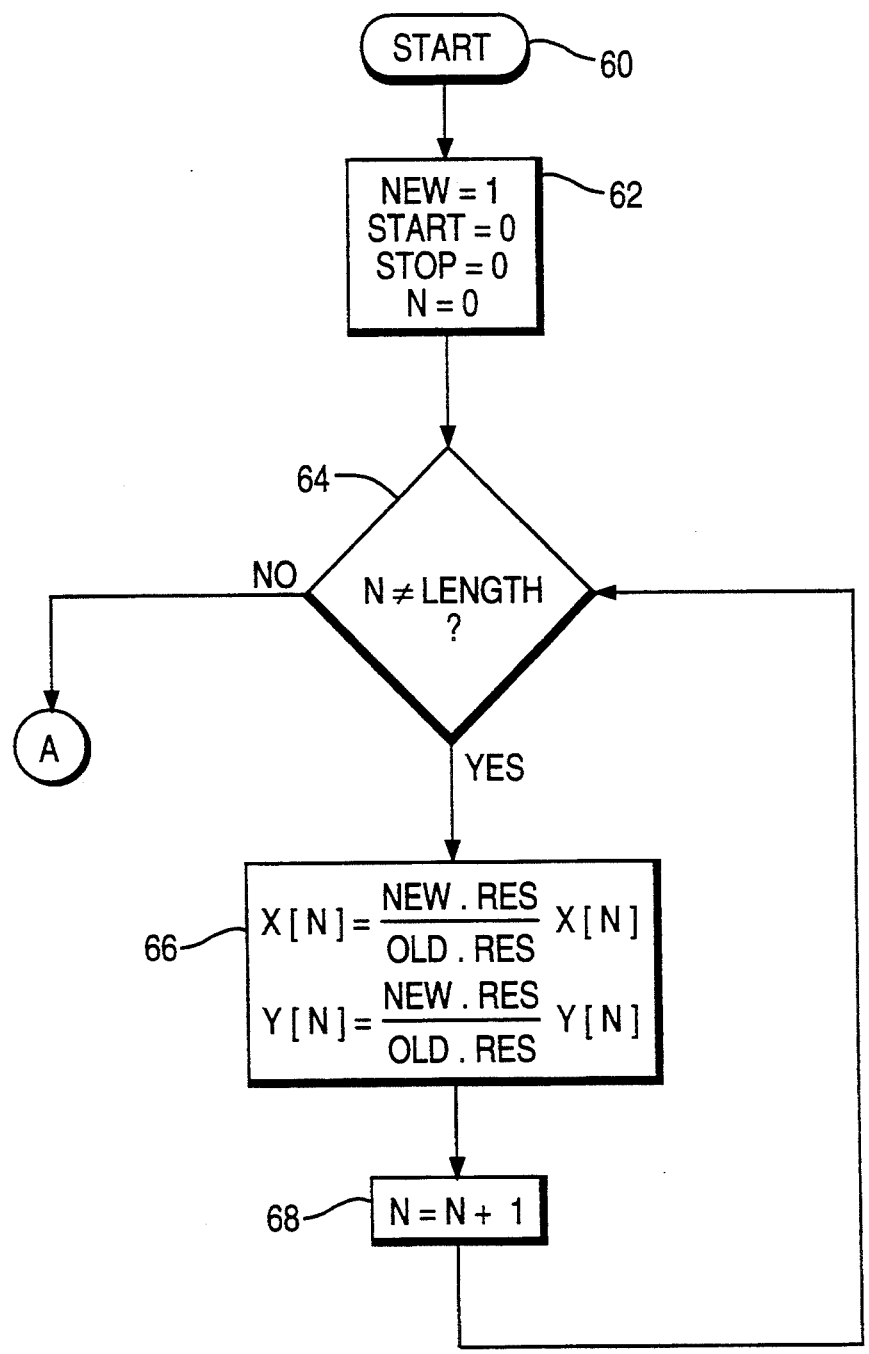
FIGS. 3A through 3E are a flowchart for a digital computer program which reads, compresses and stores signature data.

Referring to FIG. 3A, the procedure starts at block 60. In block 62, the different variables used later on in the procedure are initialized: "new" is set to 1, "start" is set to 0, "stop" is set to 0, and "n" is set to 0.

In block 64, an inquiry is made as to whether "n" is not equal to "length". If so, the procedure continues to block 66, where the coordinates "x[n]" and "y [n]" are scaled to the new resolution, "new_res". Scaling is accomplished by multiplying each coordinate in turn by the scalar ("new_res"/"old_res"). Following this, "n" is incremented by one in block 68, and the procedure branches back to block 64.

If "n" is not equal to "length", the procedure continues to block 70 (FIG. 3B), where an inquiry is made as to whether "length" is less than or equal to 2. If so, there is no use trying to compress this handwriting record, as it is already as small as it could possibly be. In this case, the procedure continues to block 72, where "new" is set equal to "length". The procedure then terminates at block 74.

If length is not less than or equal to 2, the procedure continues to block 76, where "stop" is incremented by one. Following this, an inquiry is made at block 78 to determine whether "stylus[stop]" is equal to 1. If not, then the presently processed point is a continuation of a previous stroke. In that case, the procedure continues to block 80 (FIG. 3C), where "midpoint" is set equal to "start" plus one. An inquiry is then made at decision point 82 to determine whether "midpoint" is not equal to "stop". If so, the procedure continues to decision point 84, where an inquiry is made as to whether the point (x[midpoint], y[midpoint]) can be discarded. Otherwise, the procedure branches to block 94 (FIG. 3E) via node 93.

Figure 3B:
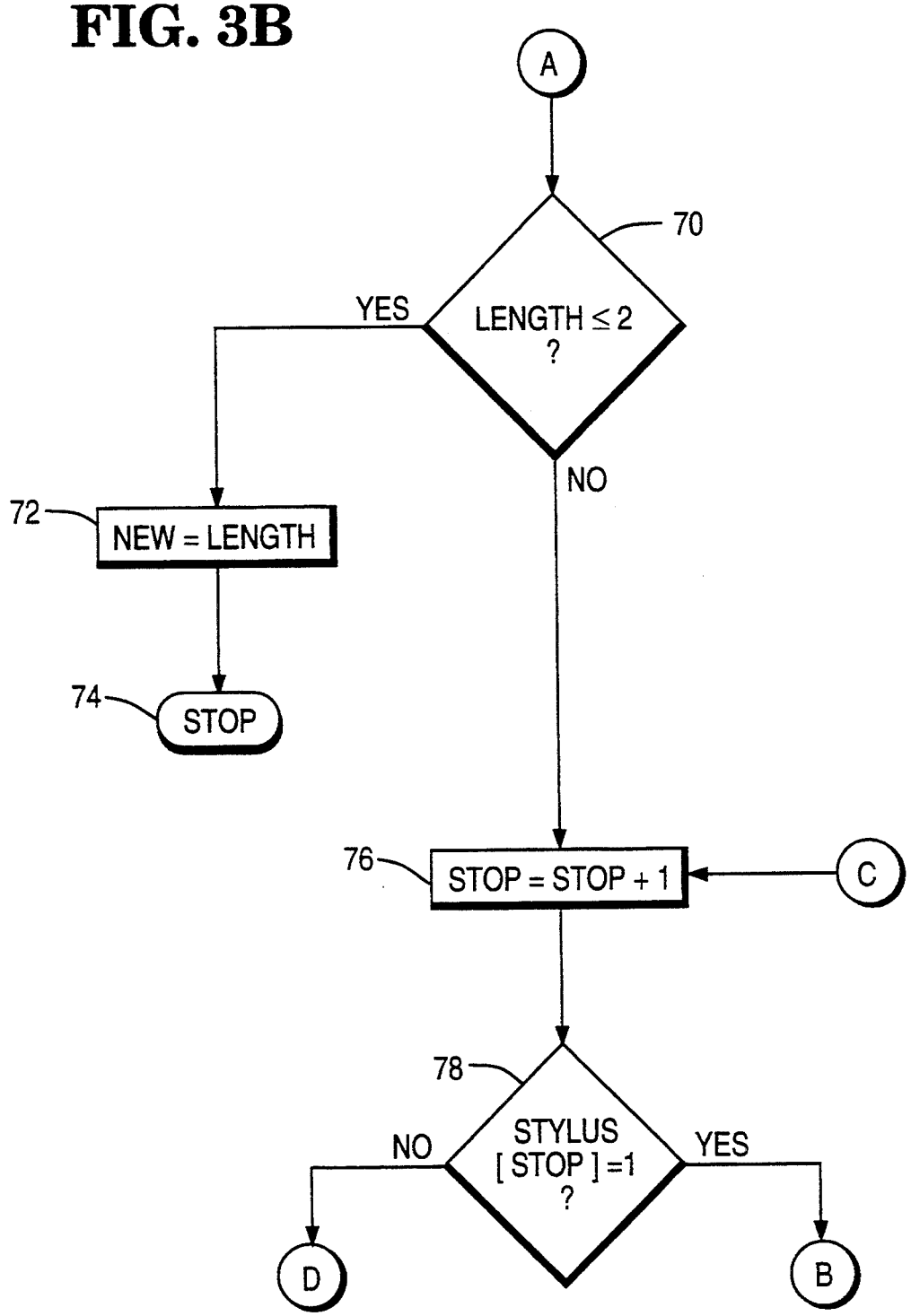
Figure 3C:
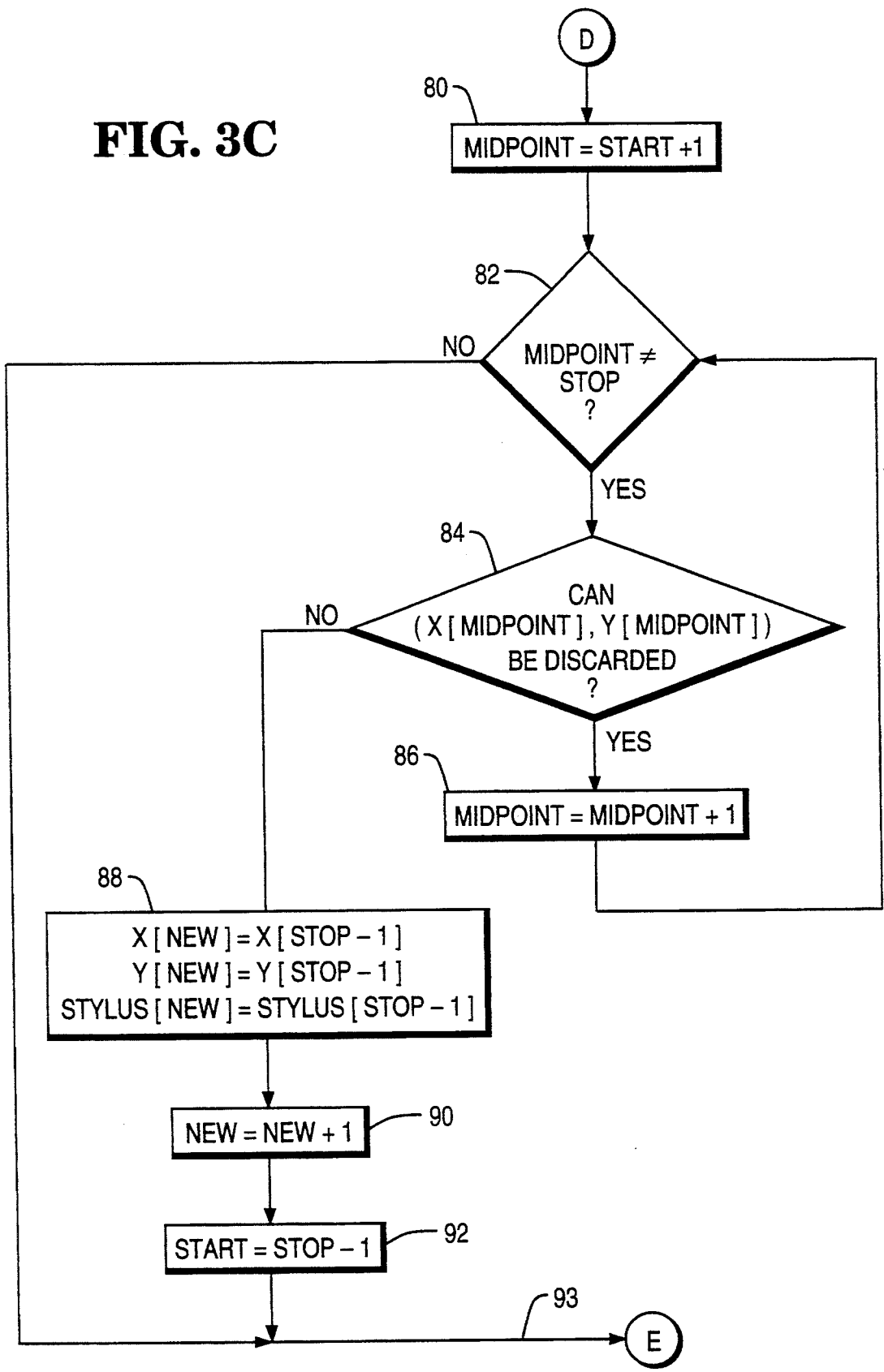
Figure 3D:
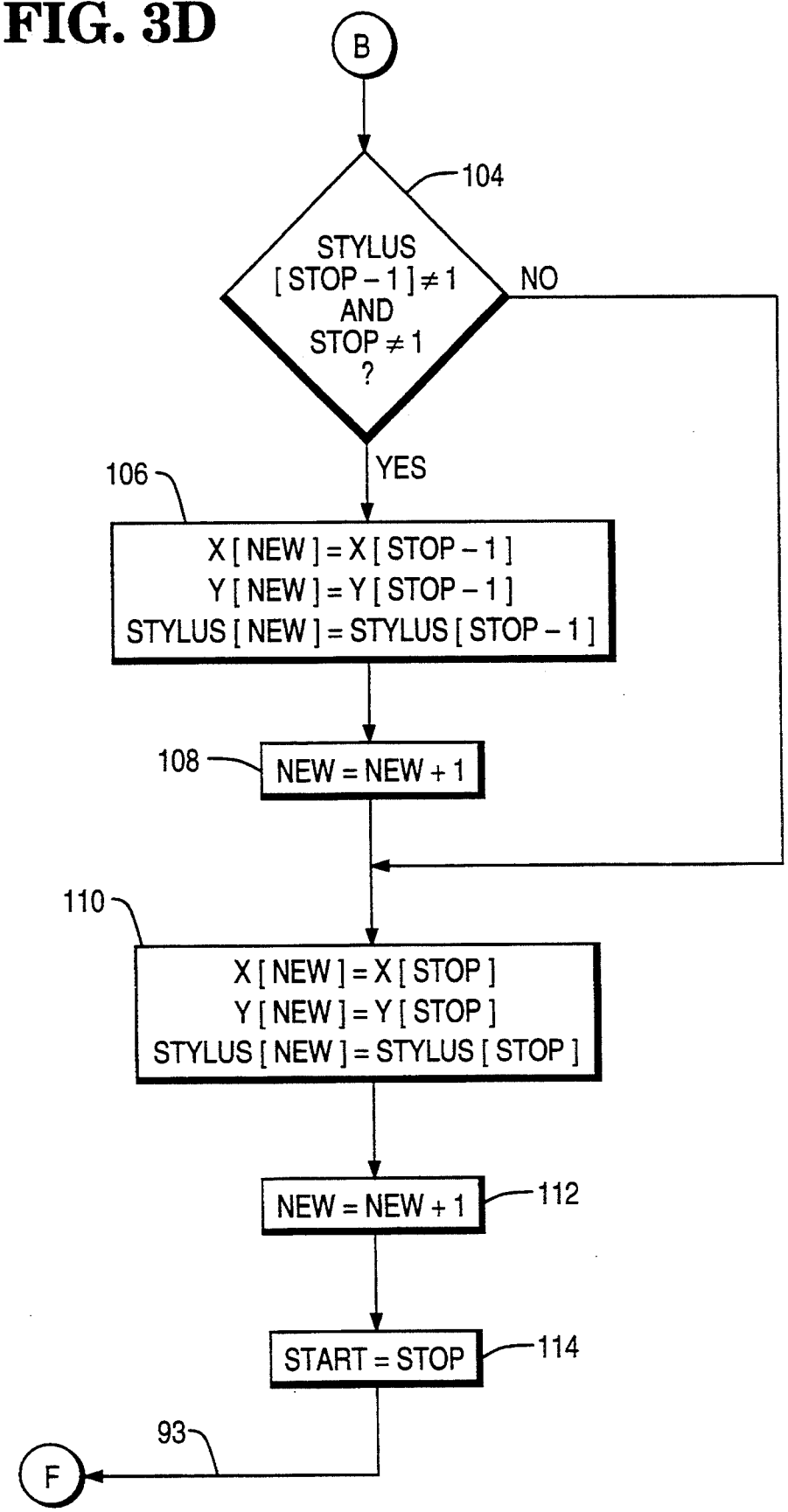
Figure 3E:
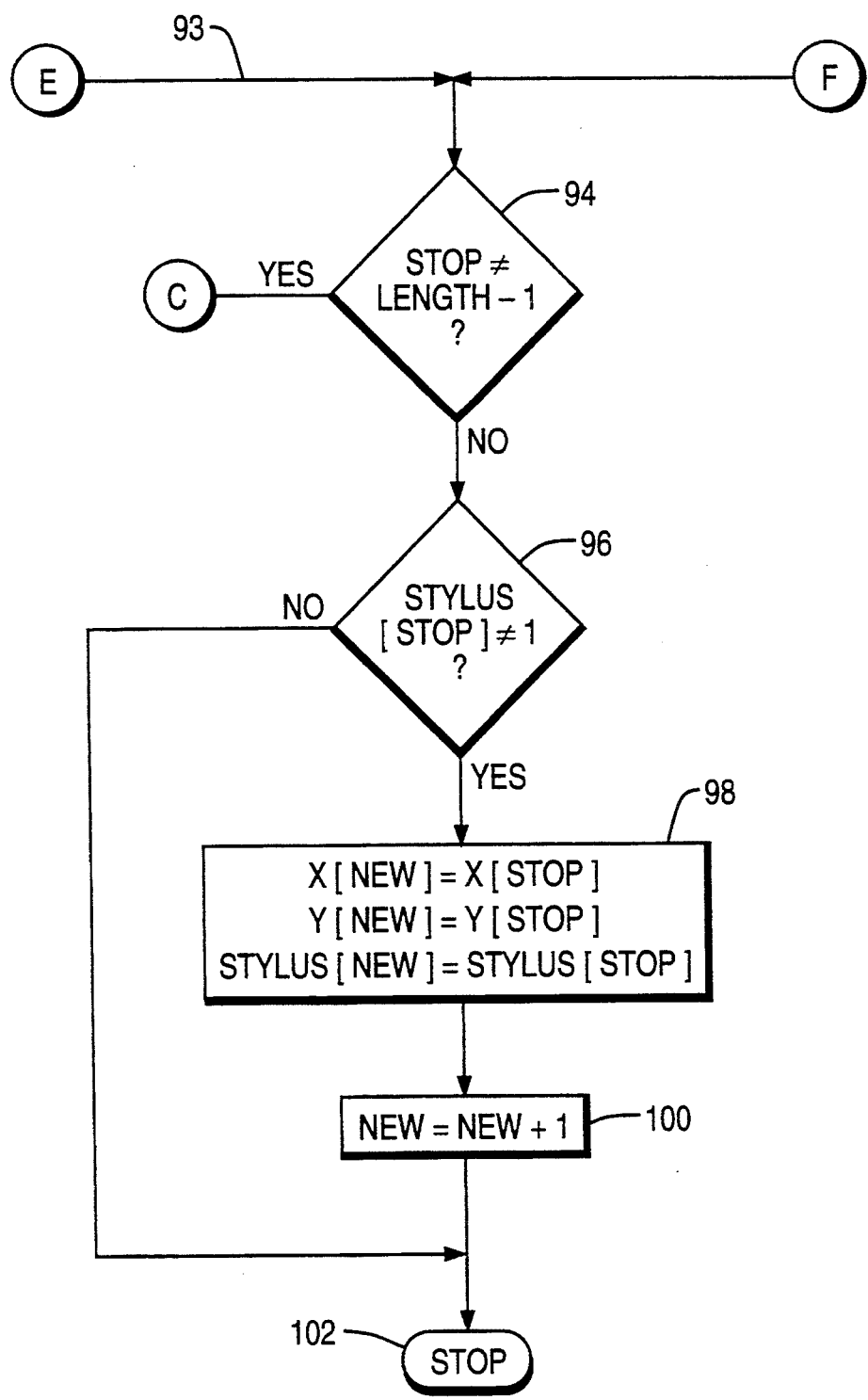

Returning to block 84 of FIG. 3C, if the point (x[midpoint],y[midpoint]) can be discarded, execution continues to block 86, where "midpoint" is incremented by one, and the procedure returns to block 82. Otherwise, the procedure continues to block 88.

In block 88, the point indexed by "stop" minus 1 is stored in the compressed handwriting record by setting "x[new]" equal to "x[stop−1]", "y[new]" equal to "y[stop−1]", and "stylus[new]" equal to "stylus[stop−1]".

Following block 88, "new" is incremented by one in block 90 and start is set equal to stop−1 in block 92. The procedure then branches to block 94 (FIG. 3E) via node 93.

In block 94, an inquiry is made to determine whether stop is not equal to length minus 1. If so, execution continues branches back to block 76 (FIG. 3B). If not, the entire handwriting record has been processed, and the procedure continues to block 96 where an inquiry is made to determine whether stylus[stop] does not equal one. If not, the procedure ends in block 102. Otherwise, the point indexed by "stop" is added to the end of the compressed handwriting record in block 98 by setting "x[new]" equal to "x[stop]", setting "y[new]" equal to "y[stop]", and setting "stylus[new]" equal to "stylus[stop]". New is then incremented by one in block 100 and the procedure ends in block 102.

Returning to decision point 78, if "stylus[stop]" is equal to one, the procedure continues instead to block 104 (FIG. 3D), where an inquiry is made as to whether "stylus[stop−1]" is not equal to one and "stop" is not equal to one. If either condition is false, execution continues to block 110. Otherwise, execution continues to block 106, where the point indexed by "stop" minus one is stored in the compressed handwriting record by setting "x[new]" equal to "x[stop−1]", "y[new]" equal to "y[stop−1]", and "stylus[new]" equal to "stylus[stop−1]". "new" is then incremented by one in block 108. Following this, the point indexed by "stop" is stored in the compressed handwriting record by setting "x[new]" equal to "x[stop]", setting 'y[new]" equal to "y[stop]", and setting stylus[new]" equal to "stylus[stop]" in block 110. "new" is then incremented by one in block 112. Following this, the procedure continues to block 114, where "start" is set equal to "stop". The procedure then continues to block 94 (FIG. 3E) via node 93.

It is not necessary that the guide lines used in accordance with this invention be straight lines. It is also practical to determine the redundancy of a midpoint based upon its location relative to a curved guide line extending in the strokewise direction. Such a curved guide line may be generated, for instance, by computing the coefficients of a polynomial function passing through the stop point, the start point and one or more previous start/stop points. It could also be generated through use of a non-rectangular coordinate system. For example, a curved guide line could be constructed in a circular coordinate system as an arc of constant radius.

It is also apparent that a guide line may be projected beyond a stop point and used for checking the redundancy of midpoints which are beyond the stop point.

Furthermore, it is possible to generate the handwritten signature with the aid of devices other than a stylus-activated digitizer. For example, a mouse or a puck activated digitizer could be used.

Figure 4:
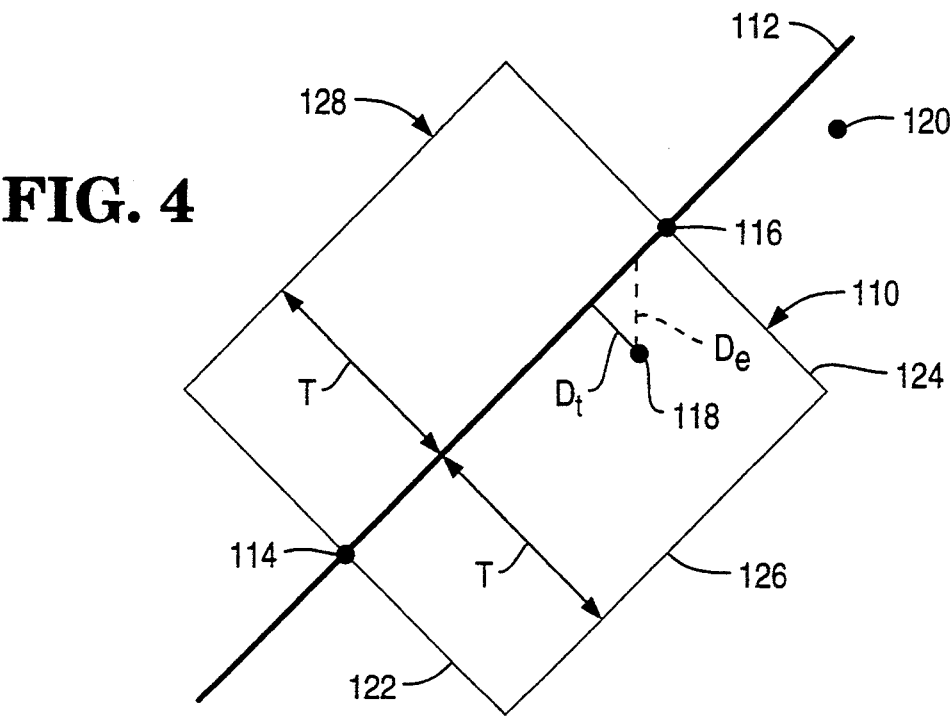
FIG. 4 is a schematic illustration of a linear fit criterion for discarding midpoint coordinate data.

Turning now to FIG. 4, a rectangle 110 is shown about guide line 112 from a signature entered into digitizer 20. Rectangle 110 includes sides 122–128. Points 114 and 116 represent start and stop points of line 112. Points 118 and 120 represent points sampled between points 114 and 116. Under the method of the present invention, point 118 is discarded, while point 120 is not discarded. The width of the rectangle is represented here as twice a threshold distance T, which in practice is chosen to preserve a high quality printed image.

Referring now to FIGS. 5A through 5D, a first embodiment of the method disclosed by Wagner et al. begins at start 130. In block 132, an inquiry is made to determine whether guide line 112 is horizontal. Computer 12 compares y[start] with y[stop] to see if they are equal. If the condition is true, execution begins at block 144 where an inquiry is made to determine whether x[midpoint] is within the interval between x[start] and x[stop]. If it is not within that interval, then the midpoint is discarded and execution transfers to the end of the procedure at block 168. If the inquiry in block 144 is true, then the method proceeds to block 146 where the absolute value of y[midpoint]−y[start] is compared to the threshold value T. If the condition in block 146 is true, then the midpoint is discarded in block 148 and the method terminates in block 168. If the inquiry in block 146 is false, then the internal point is not discarded and the method terminates in block 168.

If the inquiry in block 132 is false, then an inquiry is made in block 134 to determine whether guide line 112 is vertical. Computer 12 compares x[start] with x[stop] to see if they are equal. If the condition is true, then execution begins in block 150 where an inquiry is made to determine whether y[midpoint] is within the interval between y[start] and y[stop]. If it is not, then the midpoint is discarded and the method terminates in block 168. If the inquiry in block 150 is true, then the absolute value of x[midpoint]−x[start] is compared to the threshold value T in block 152. If the result is not greater than threshold value T, then the midpoint is discarded in block 154 and the method terminates in block 168. If the inquiry in block 152 is false, then the midpoint is not discarded and the method ends in block 168.

If the inquiry in block 134 is false, then guide line 112 is neither vertical nor horizontal and the method proceeds to block 136, where an inquiry is made to determine whether y[start] is less than y[stop]. If the inquiry is true, then the start and stop points are swapped in block 138 and the method proceeds to block 140. If the inquiry is false, then the method proceeds directly to block 140. In block 140, the resulting start point is translated to the origin. In block 142, the same translation is applied to the remaining points.

In blocks 155 and 156, the parallel test is performed. The parallel test is a heuristic and determines whether the absolute value of $D_e$ is less than or equal to the threshold value T. In block 155, distance $D_e$ is calculated based on the following equations:

$$slope = (y[start] - y[stop])/(x[start] - x[stop])$$

$$intercept = y[start] - slope \cdot x[start]$$

$$y[calculated] = slope \cdot x[midpoint] + intercept$$

In block 156, the comparison is made between distance $D_e$ and threshold value T. If the inquiry in block 156 is false, then the point is discarded and the method terminates in block 168. If the inquiry is true, then the parallel test is passed and the perpendicular test is begun in block 158.

The perpendicular test determines whether a midpoint lies between lines 122 and 124. Thus, in block 158, x[midpoint] is inserted into the equation for line 122. The equation for this line is determined using the start point and a slope equal to the negative reciprocal of line 112. In block 160, an inquiry is made to determine whether y[midpoint] is greater than or equal to y[calculated]. If the inquiry is not true, then the point is discarded and the method terminates in block 168. If the condition is true, then the method proceeds to block 162.

In block 162, x[midpoint] is inserted into the equation for line 124. The equation for this line is determined using the start point and a slope equal to the negative reciprocal of line 112. In block 164, an inquiry is made to determine whether y[midpoint] is less than or equal to y[calculated]. If the condition is true, then the midpoint is not and the method terminates in block 168. If the condition is true, then the midpoint is discarded in block 166 and the method terminates in block 168.

Advantageously, under the method of FIGS. 5A through 5D, points like point 120 are retained.

Turning now to FIGS. 6A through 6D, a second embodiment of the method of Wagner et al. is shown beginning with START block 170. Blocks 172 through 194 are identical to blocks 132 through 154 of FIGS. 5A–5C.

Figure 6A:
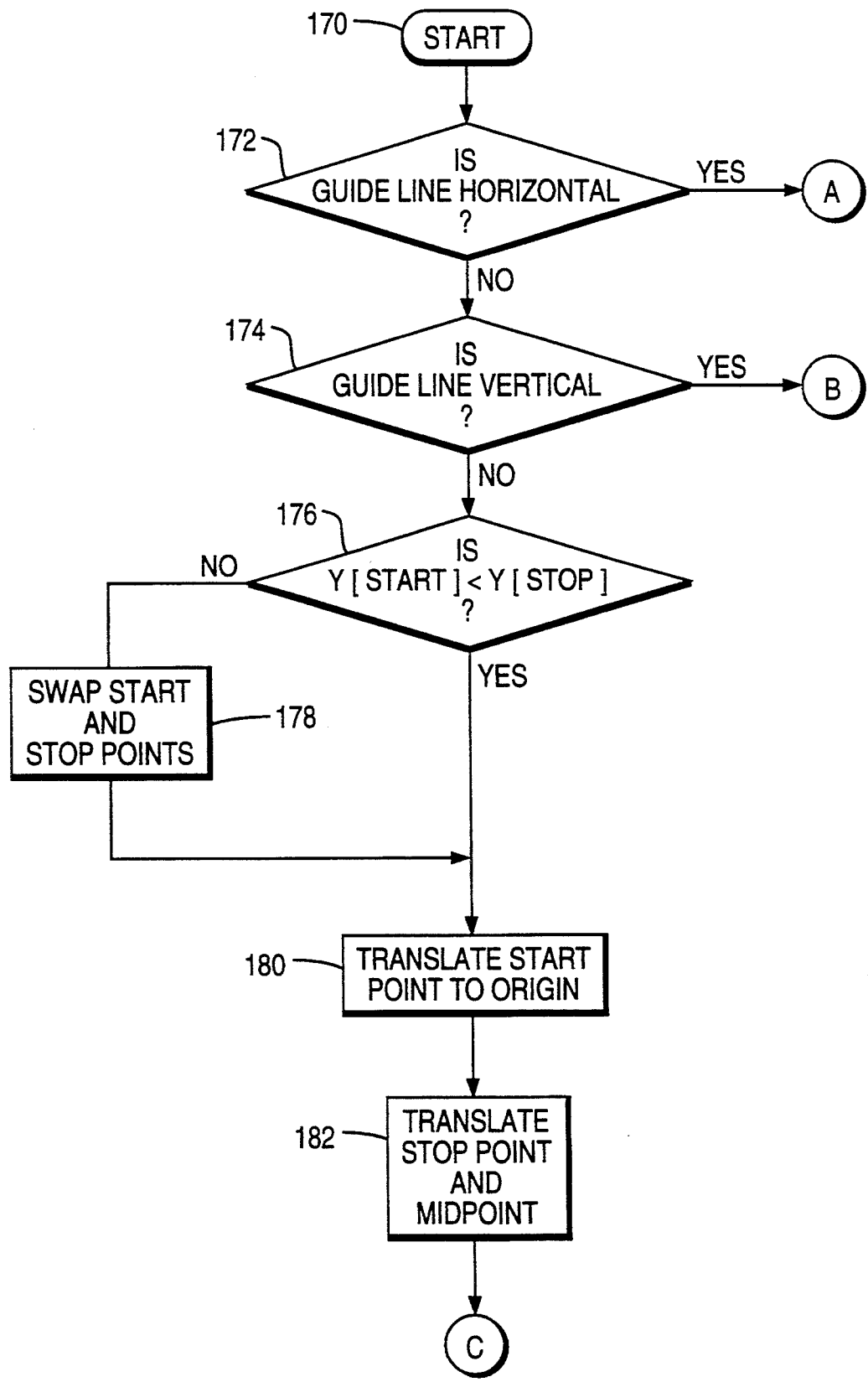
FIG. 6A through 6D are flowcharts for a second embodiment of a method for discarding coordinate data.
Figure 6B:
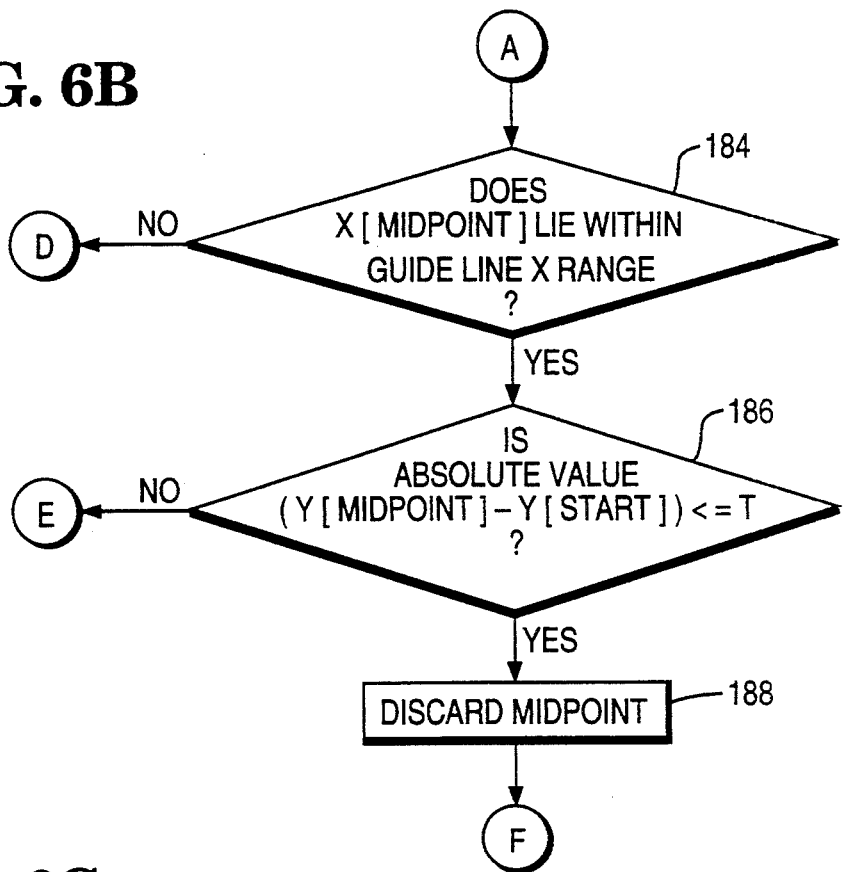
Figure 6C:
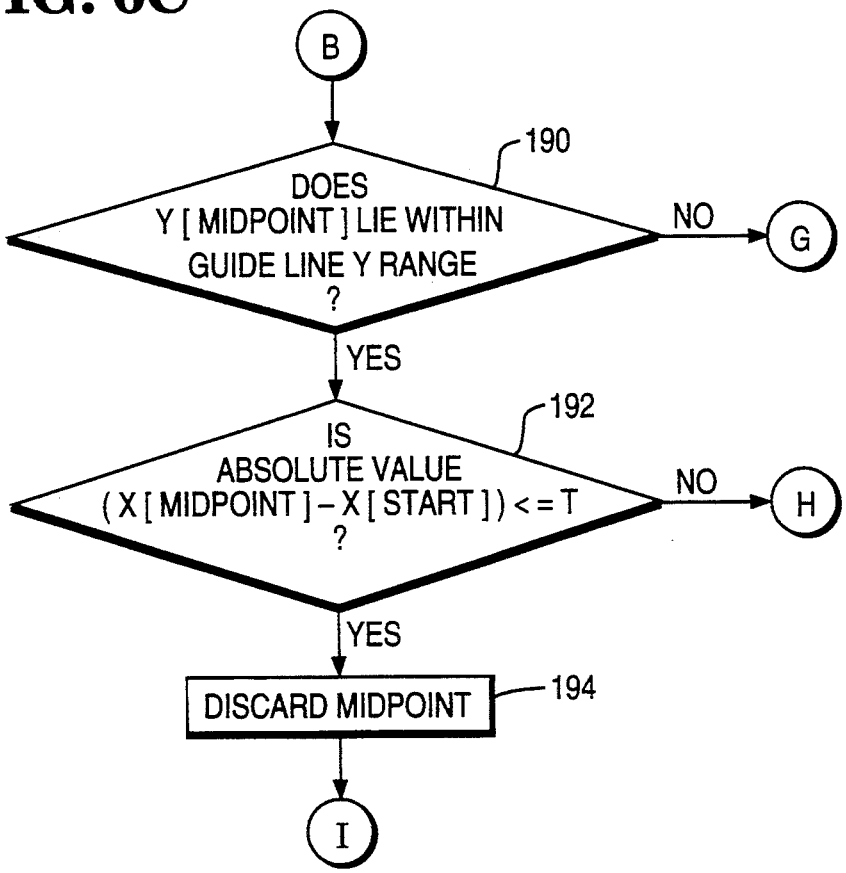
Figure 6D:
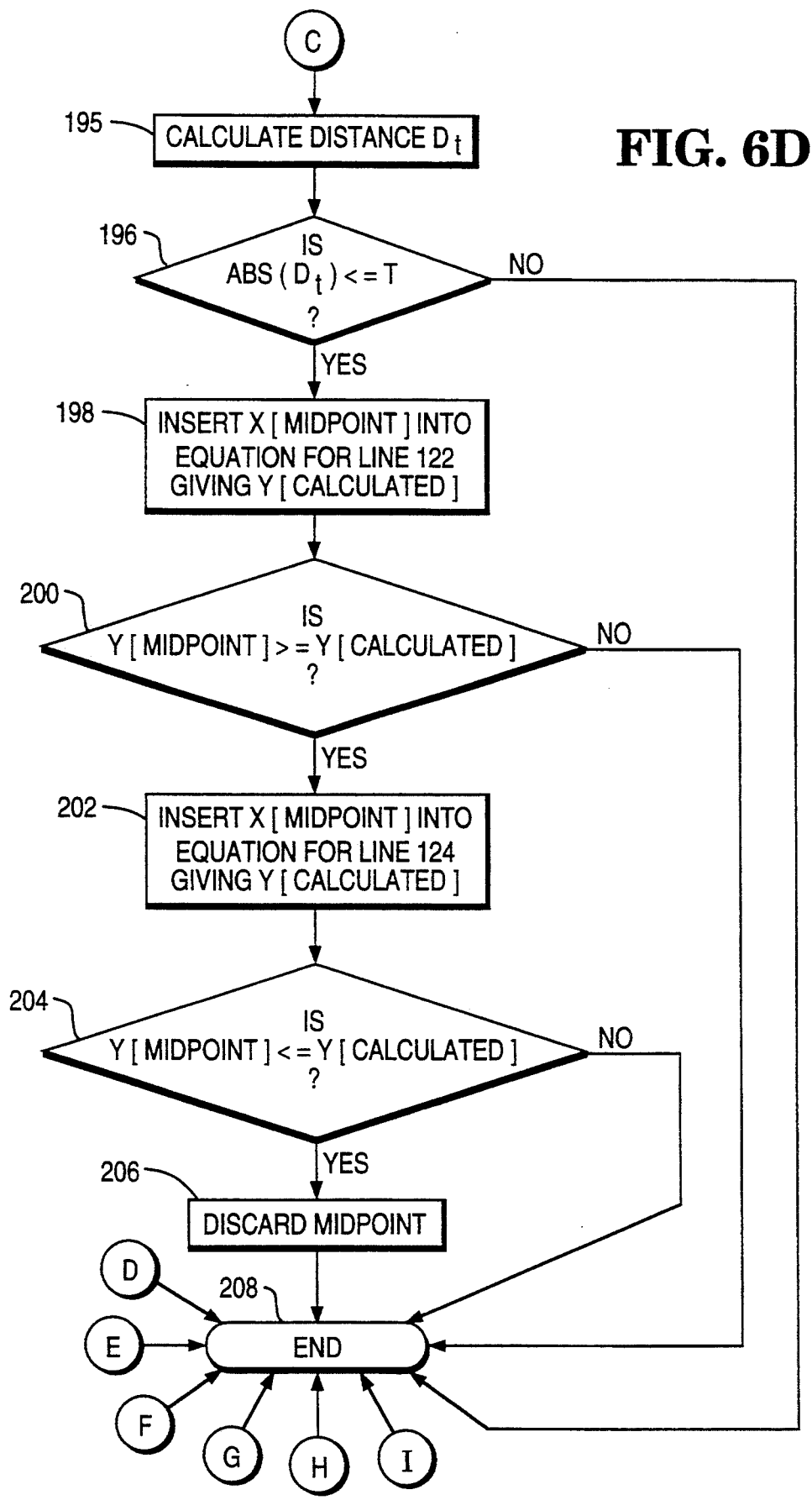

Thus, in block 195 of FIG. 6C, the true distance $D_t$ is obtained using the formula:

$$D_t = \frac{(Ax + By + C)}{(A^2 + B^2)^{1/2}}$$

where $Ax+By+C=0$ is the equation of guide line 112 and where the x and y values pertain to the values for the midpoint.

In block 196, an inquiry is made to determine whether the true distance is less than or equal than the threshold distance T. If so, then the method continues in blocks 198 through 208 with the perpendicular test as in FIG. 5C, blocks 160 through 168. If the perpendicular test is not satisfied, then the midpoint is discarded and the method terminates in block 208.

Advantageously, under the method of FIGS. 6A through 6D, points like point 120 are retained. However, since distance $D_t$ is always less than distance $D_e$, more points can potentially qualify for elimination for a given threshold value T.

Figure 7:
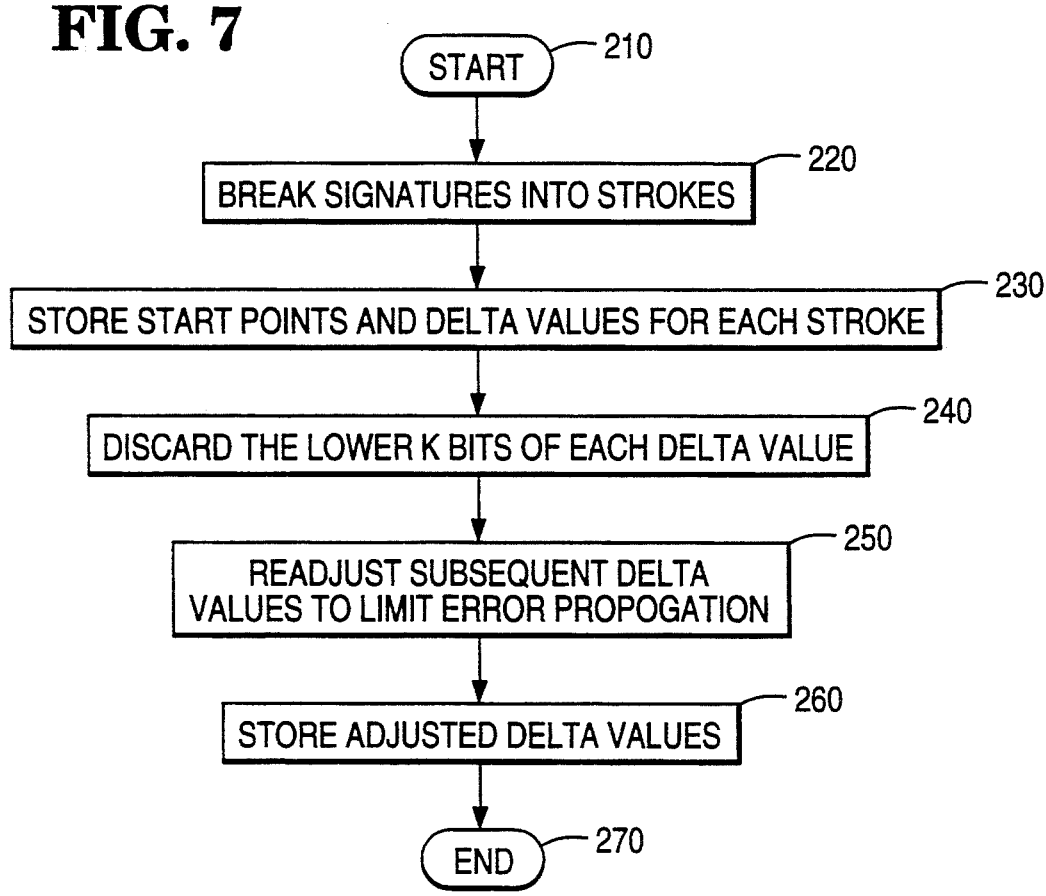
FIG. 7 is a flowchart for storing coordinate data.
Figure 5A:
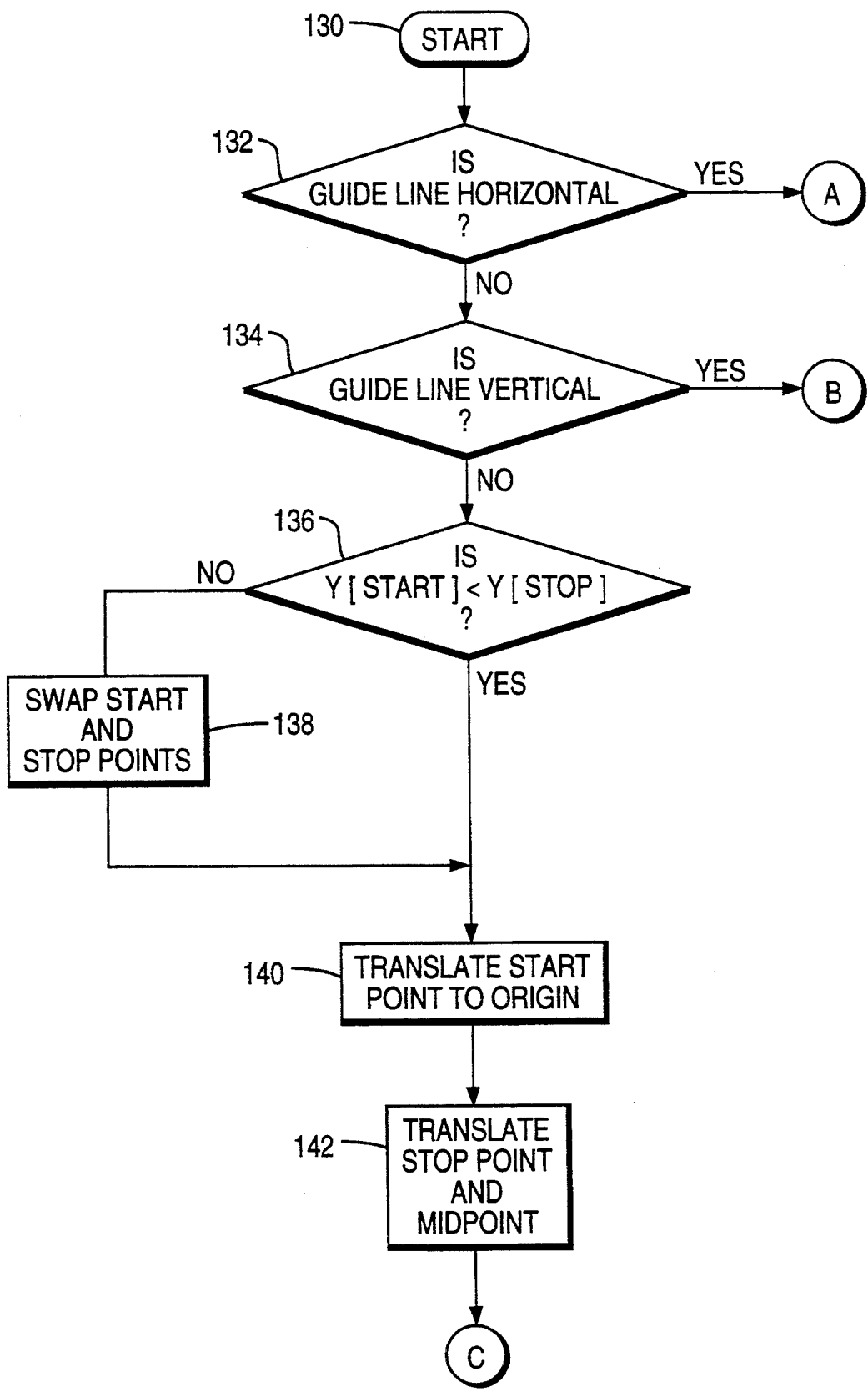
FIGS. 5A through 5D are flowcharts for a first embodiment of a method for discarding coordinate data.
Figure 5B:
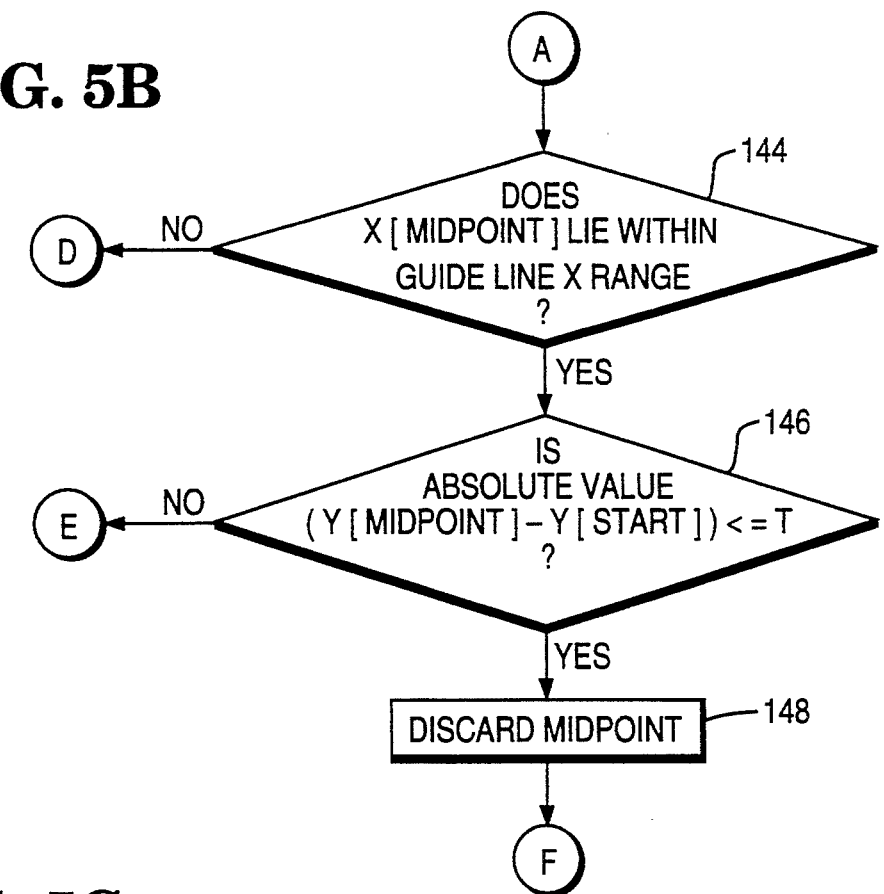
Figure 5C:
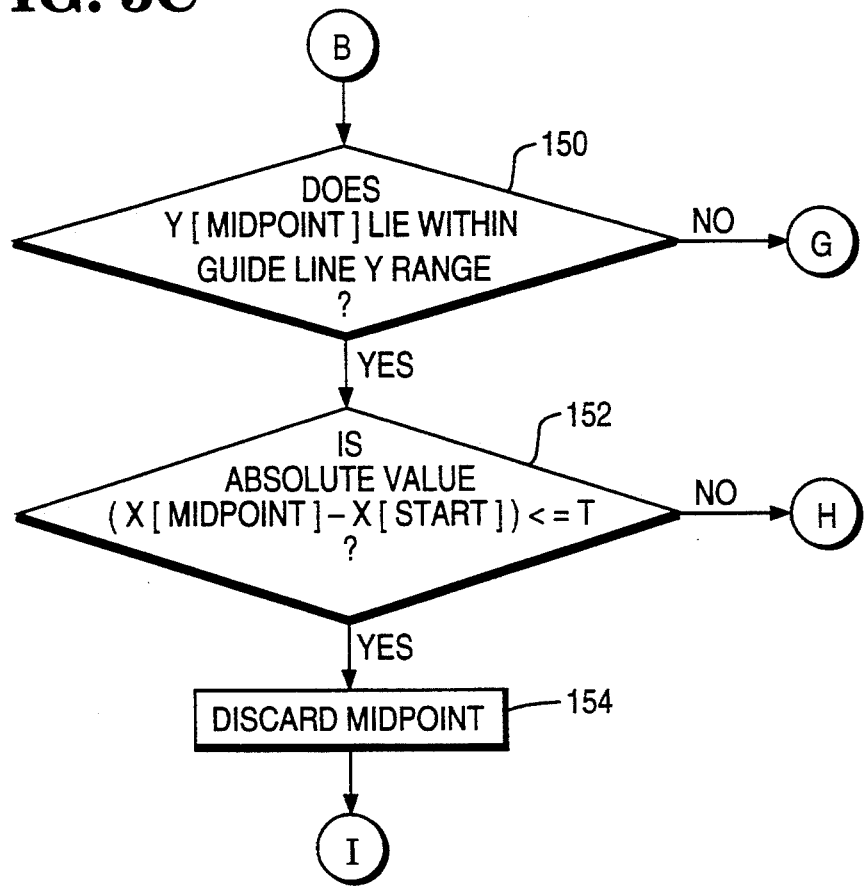
Figure 5D:
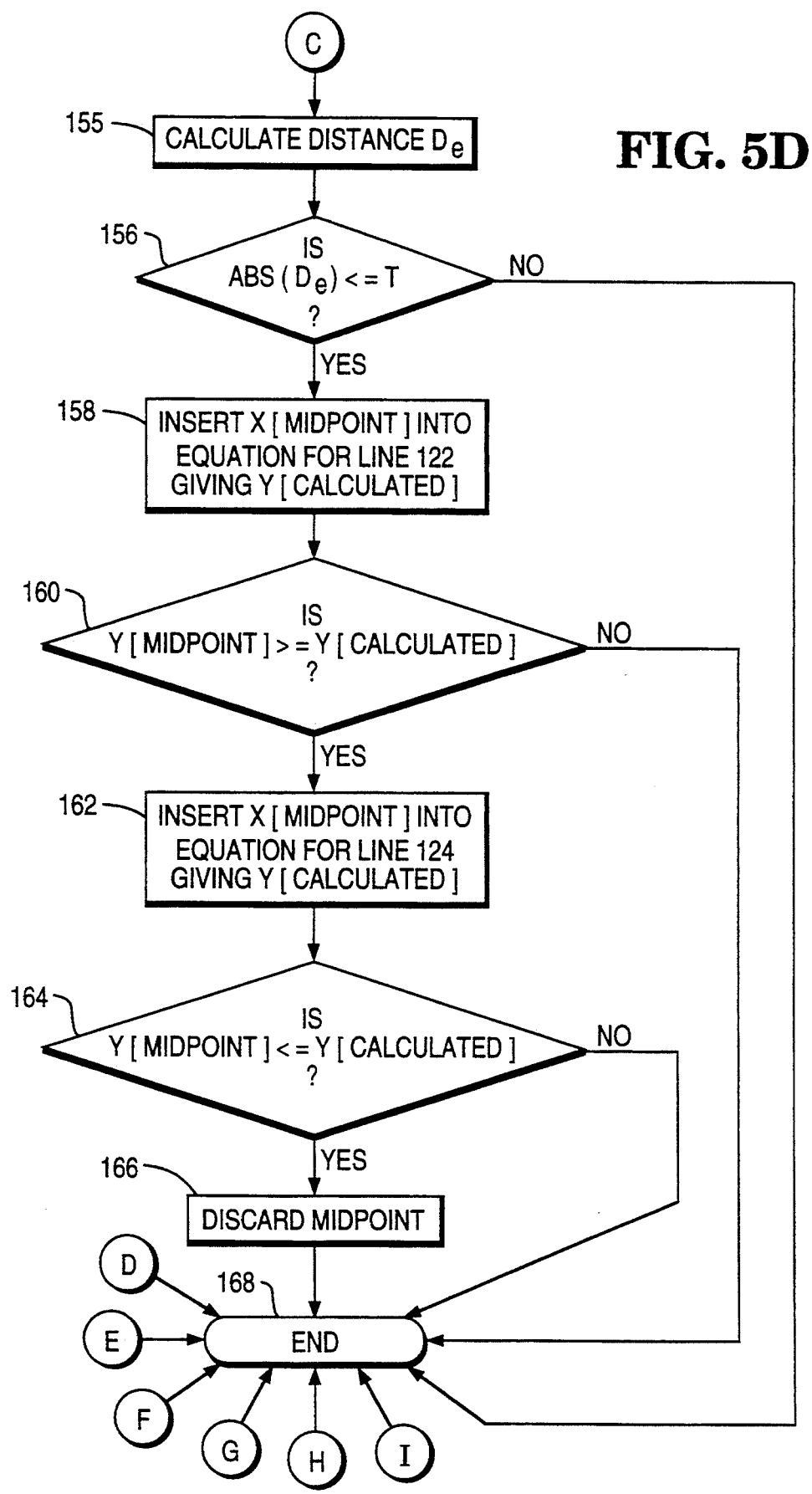

Turning now to FIG. 7, a method of storing compressed data as disclosed by Wagner et al. is shown beginning with START 210. Such data may represent coordinate values which have been scaled to a predetermined resolution as disclosed above, typically 512 dots per inch. Typically, though, the media used to reconstruct fixed-copy images of the signature data allow for a smaller resolution (about 75 to 300 dots per inch). The storing method of the present invention takes advantage of this fact to save storage space by permitting a relatively small error to exist in the stored coordinates, since that error is virtually eliminated in the fixed-copy image due to the scaling reduction.

In block 220, the signature is broken down into strokes consisting of start and stop points as discussed above in the capture phase.

The strokes are stored in terms of the coordinates of the start point (x[start], y[start]) and delta x and delta y values, instead of start and stop points. Each stroke includes a plurality of stroke points. The reason for storing delta x and y values is that they take up less storage space. Typically, coordinate values can be stored in ten-bit bytes, while delta values require only eight bits without any loss of accuracy. Then, subsequent stroke points may be computed using a set of delta values, each delta value being applied to a previously computed stroke point.

Thus, in block 230, the start points for each stroke are stored.

Before the delta values are stored, the number of bits is reduced by shifting the delta value k bits to the right in block 240. When later retrieving the shifted delta values, each shifted delta value is shifted k bits to the left and then half of $2^{(k-1)}$ is added or subtracted depending upon the sign of the delta value.

In block 250, error propagation is limited to $2^{(k-1)}$ by readjusting delta values subsequent to the first pair of delta values for a given stroke. If the delta value is positive, then the net error is $-\text{mod}(\text{delta}, 2^k)+2^{(k-1)}$. Therefore, the subsequent delta value is decremented by this amount. If the delta value is negative, then the net error is $\text{mod}(-\text{delta}, 2^k)-2^{(k-1)}$. As before, to compensate for this error the subsequent delta value is decremented by this net error. Error propagation is further reduced in both cases when the printing scaling reduction is later done.

In block 260, the adjusted delta values are stored and the method ends in block 270.

Under the storing method of Wagner et al., satisfactory error reduction has occurred for k=3 (five bits out of eight).

Figure 8A:
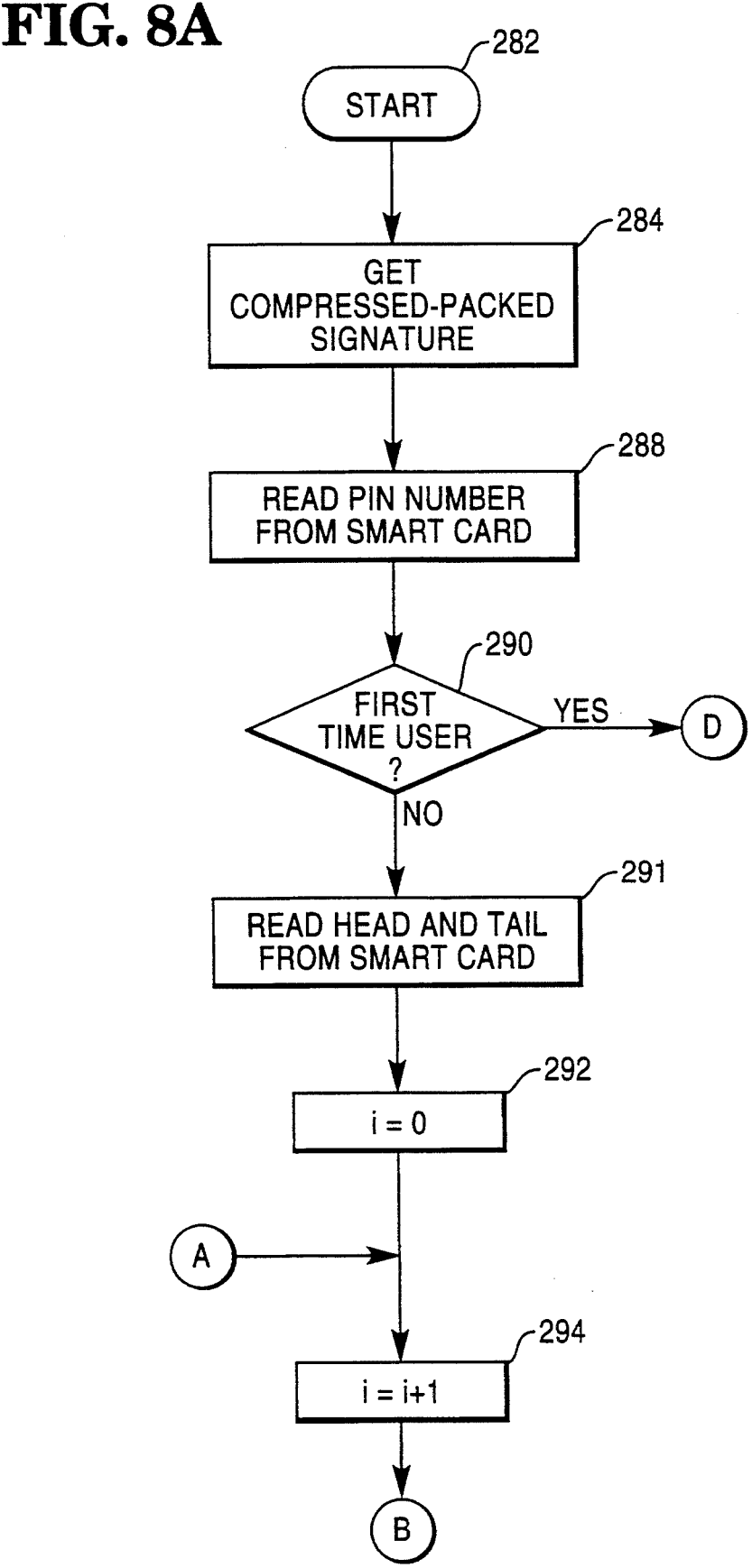
FIGS. 8A–8F are flowcharts which describe the process of capturing, archiving, and verifying signature information.

Referring now to FIG. 8A, the signature verification method begins at Start 282. In block 284, the write-capture process is begun. This process was already described in FIGS. 2A and 2B.

After block 284 is executed, the following two arrays are given values:

X[n], which is the horizontal position or X-coordinate of a data point in the signature.

Y[n], which is the vertical position or Y-coordinate of a data point in the signature.

The value of the variable n begins at 0 and is incremented for each new data point.

Sequentially execution continues at block 288, where the signer's Smart Card pin number is read and stored in the variable PINNUMBER.

Next, an inquiry at block 290 is done to determine if the value in PINNUMBER indicates a first time user. If the result is true, execution proceeds to FIG. 8C. If the result of the inquiry is false, then the model's global variable verification information must be obtained from the SMART card.

SMART card reading begins in clock 291 with the reading of the "head" and "tail" strings. The head string is the maximum length string that exists in each of the initial set of signatures forming the initial model, of length somewhere between a predetermined minimum and a predetermined maximum, found in the first k positions of each string. If no such string can be found, then the head string is set to NULL. The tail string is similar except its location is between k+1 and the end of each model signature string. A signature string is determined by the successive directions of the line segments formed by consecutive points. If the direction is in the first quadrant, then the direction is denoted by zero. If the direction is in the second quadrant, then the direction is coded as one. Likewise, for the third and fourth quadrants. After the string is determined, consecutive digits of the same value are replaced by the common digit. In this way, the most common shape of the signature at its beginning and end are captured.

The second phase of model reading requires information for global verification. The global variables have integer values and are used statistically. For example, the following nine variables are especially useful in doing signature verification as they capture both shape and time characteristics of a signature:

1. number of compressed points
2. number of 5 ms intervals needed to complete the signature
3. number of 5 ms intervals during which the pen is down while the signature is being written
4. magnitude of the average signature vector
5. magnitude of the average signature vector above the x-axis
6. magnitude of the average signature vector below the y-axis
7. average angle of average signature vector
8. average angle of average x-axis signature vector
9. average angle of average y-axis signature vector For the above variable values, integer scaling is done for the last six variables to ensure integer results of proper size are obtained. In addition, the signature signing preferably takes place along a reference line, as the vector rules assume each signature does not have much variance in the horizontal direction.

In block 292, the loop variable i is initialized to zero.

Execution continues at block 294, where the loop variable i that governs the reading of the global variable information is incremented by 1.

Figure 8B:
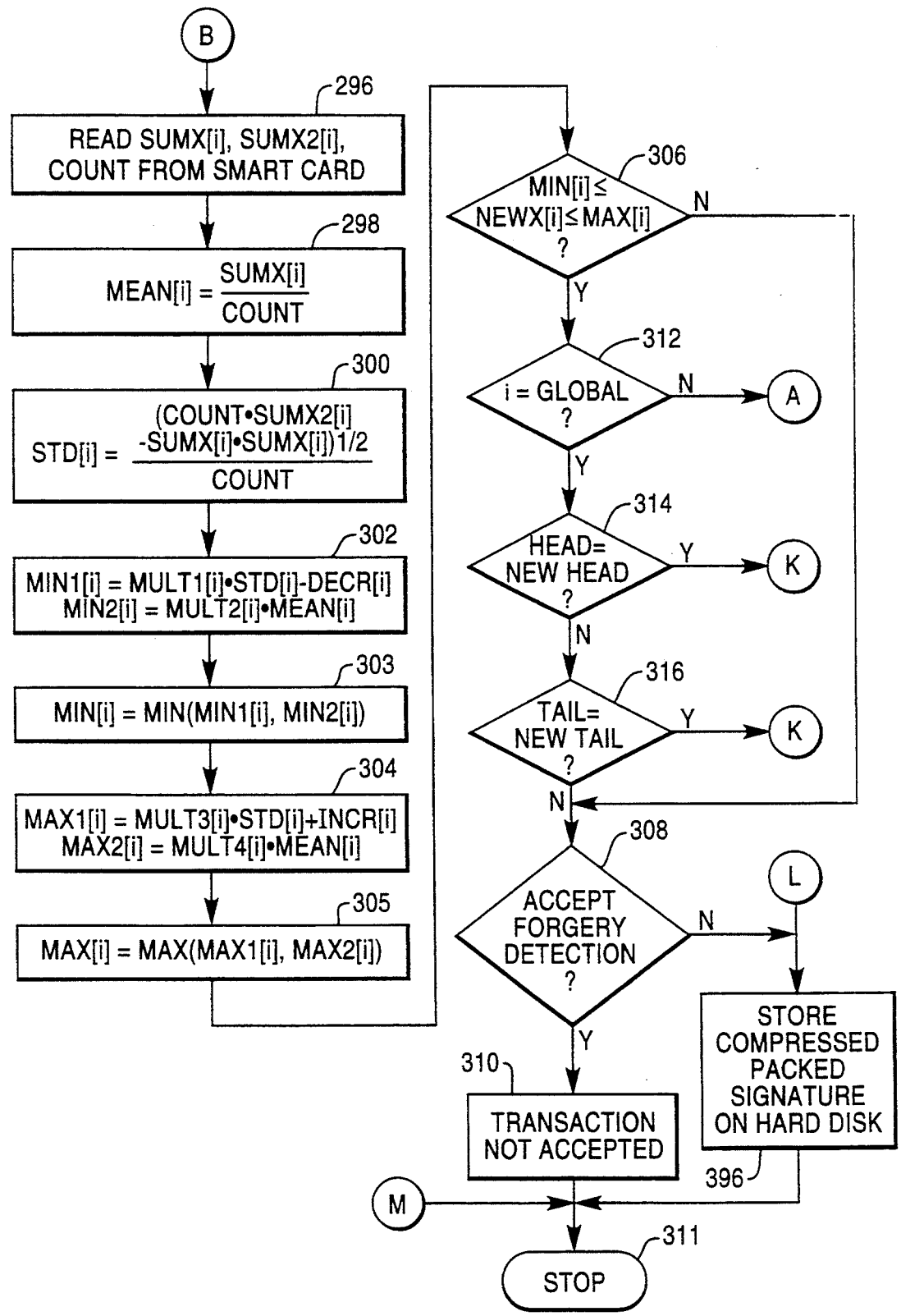

Referring now to FIG. 8B, block 296 is executed next, so that the two summation values for the global verification variable X are read from the Smart Card and stored in variables SUMX[i] and SUMX2[i] respectively. Also, the number of signatures in the model is read and stored in the count variable COUNT.

Then, block 298 is executed so that the mean for the global verification variable X is computed using the conventional formula from statistics:

$$MEAN[i] = \frac{SUM[i]}{COUNT}$$

Box 300 is executed next. The resulting computation gives the standard deviation for the global verification variable X and the result is stored in the variable standard deviation STD[i]. The standard deviation formula shown in block 300 is derived from the following well-known statistical formula thereby avoiding numerical error due to a constantly changing standard deviation involving floating point arithmetic:

$$STD[i] = \frac{(COUNT \cdot SUMX2[i] - SUMX[i]^2)^{1/2}}{COUNT}$$

Once each of the mean and standard deviation values are computed for the global verification model, the low and high values for each model variable can be computed. If a normal distribution is assumed for the signatures, then 99.7% of the data will lie between the value of the mean plus or minus three standard deviations. This coverage is necessary, since the acceptance rate for genuine signatures should be kept at 99% or higher for signers that sign consistently. To provide some leeway to this theoretical result, two low boundaries are computed and two high boundaries are computed. For each boundary, the mean and standard deviation are thus used in a more practical way.

In block 302, two lower bounds for each variable are computed. The first and second minimum boundaries MIN1[i] and MIN2[i] are determined by the following two formulas.

MIN1[i]=STD[i]·MULT1[i]−DECR[i]

MIN2[i]=MEAN[i]·MULT2[i]

In block 303, the value for MIN[i] is chosen as the minimum of these two values.

In block 304, two upper bounds for each variable are computed. The first and second maximum boundaries MAX1[i] and MAX2[i] are determined by the following two formulas:

MAX1[i]=STD[i]·MULT3[i]+INCR[i]

MAX2[i]=MEAN[i]·MULT4[i]

In block 305, the value for MAX[i] is chosen as the maximum of these two values.

After the boundary values are set, an inquiry at block 306 is made to see if each global verification value lies within the two boundary values. If it does, then execution continues at block 312, where an inquiry is done to see whether there are any more global variables in the model to process. If there are, then execution proceeds back to block 294, where loop variable i is incremented by one in preparation for reading the next global variable information.

Returning to block 312, if the result of the inquiry is true, then all the candidate global variable values are within the respective two boundaries.

In block 314, the HEAD string is compared to NEWHEAD. If the result is true, then the candidate signature is accepted and the method proceeds to block 380 of FIG. 8F.

If the result is false, then the method proceeds to block 316, in which the TAIL string is compared to NEWTAIL. If the result is true, then the signature is accepted and the method proceeds to block 380 of FIG. 8F.

If the result is false, then the candidate signature does not pass all of the tests and the method proceeds to block 308 where an inquiry is made to determine whether the operator wishes to accept the forgery recommendation. If so, then the method proceeds to block 310 in which the signer is informed that the signature and transaction are not accepted. In block 311, the method ends.

Returning to block 308, if the operator decides to ignore the forgery recommendation, then the method proceeds to block 396, in which the compressed-packed signature is stored, but the model is not updated.

Returning back to block 306, if the inquiry is false and one of the global variable tests fails, then the method proceeds to block 308 to determine whether the operator wishes to ignore the forgery recommendation.

Figure 8C:
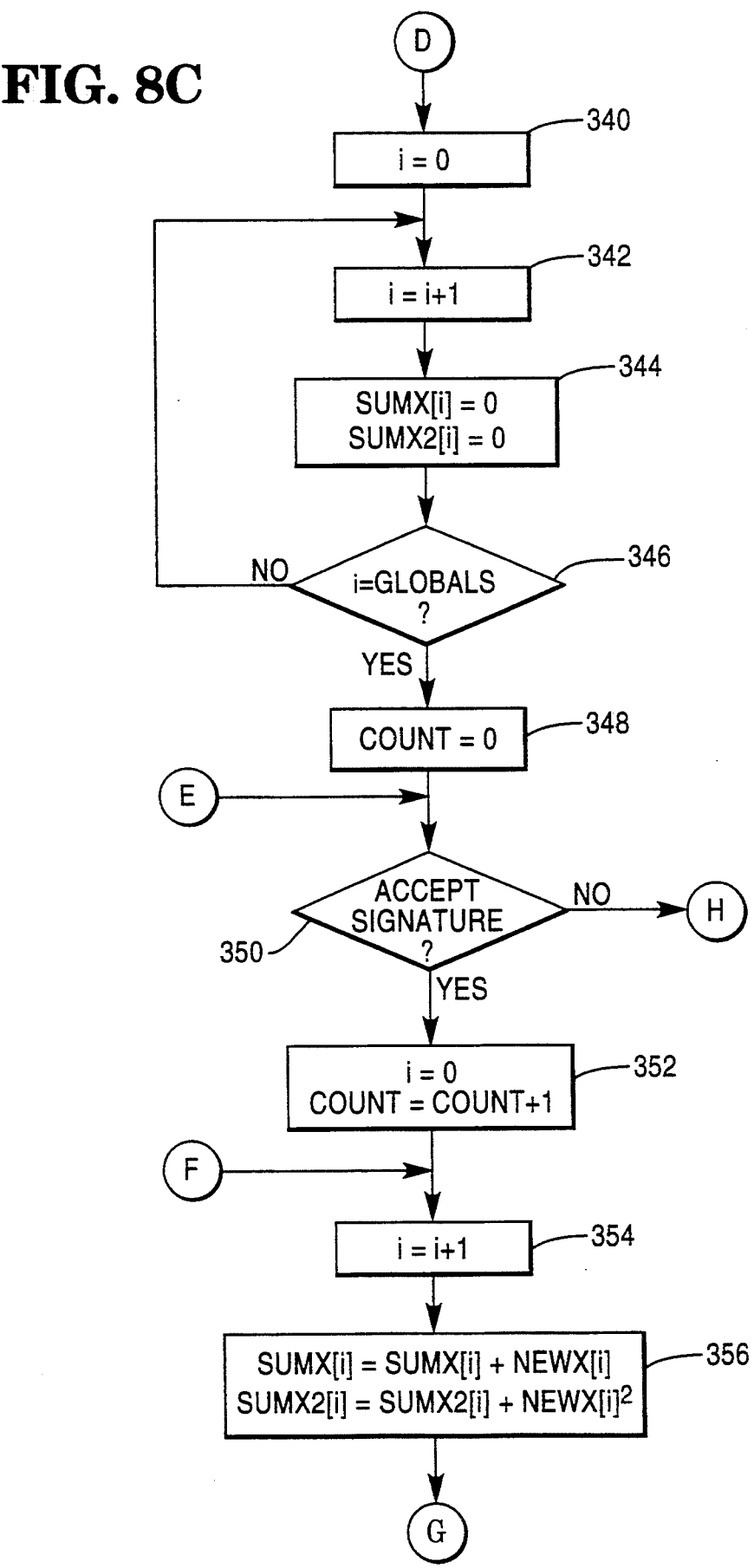
Figure 8D:
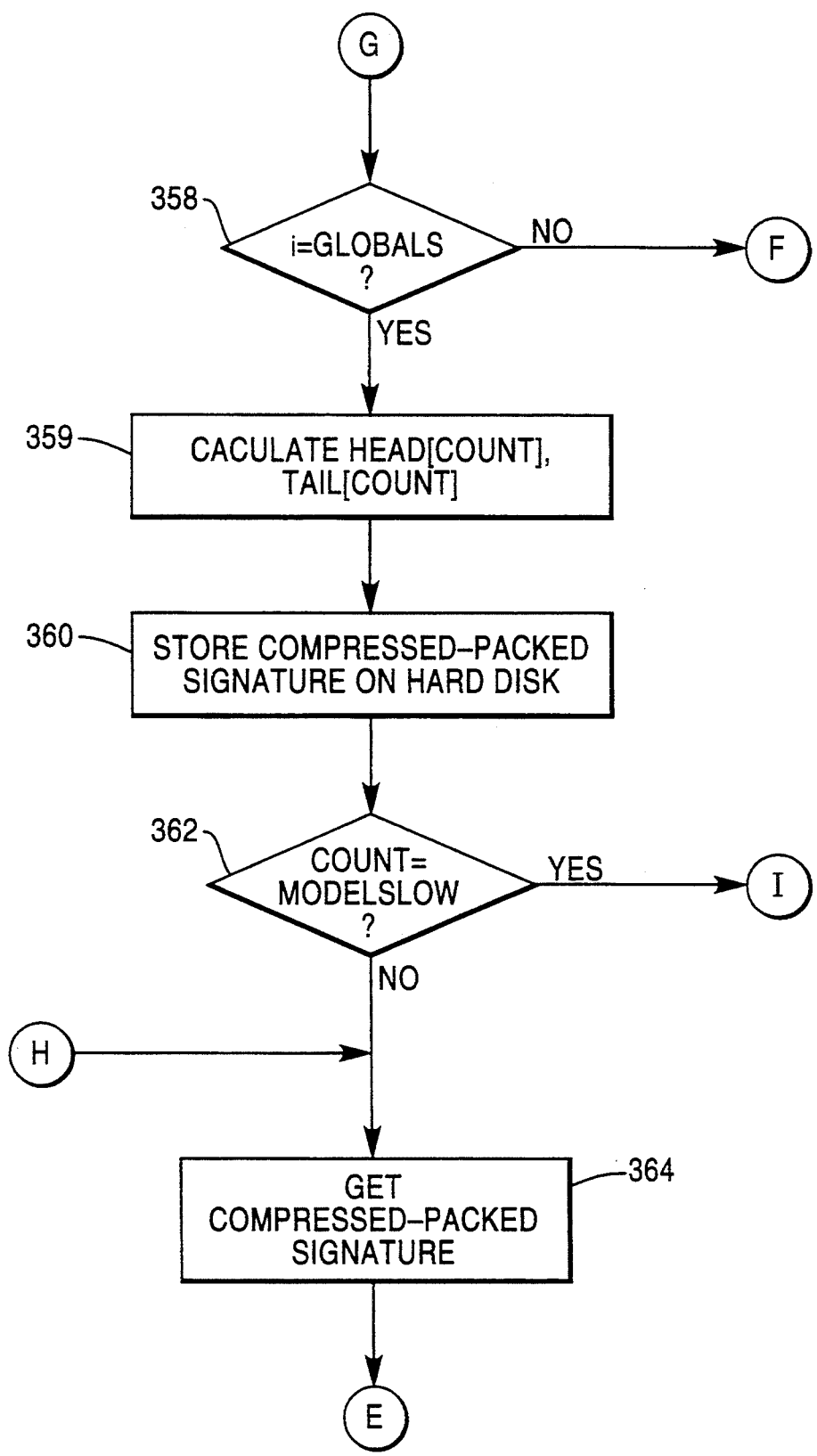
Figure 8E:
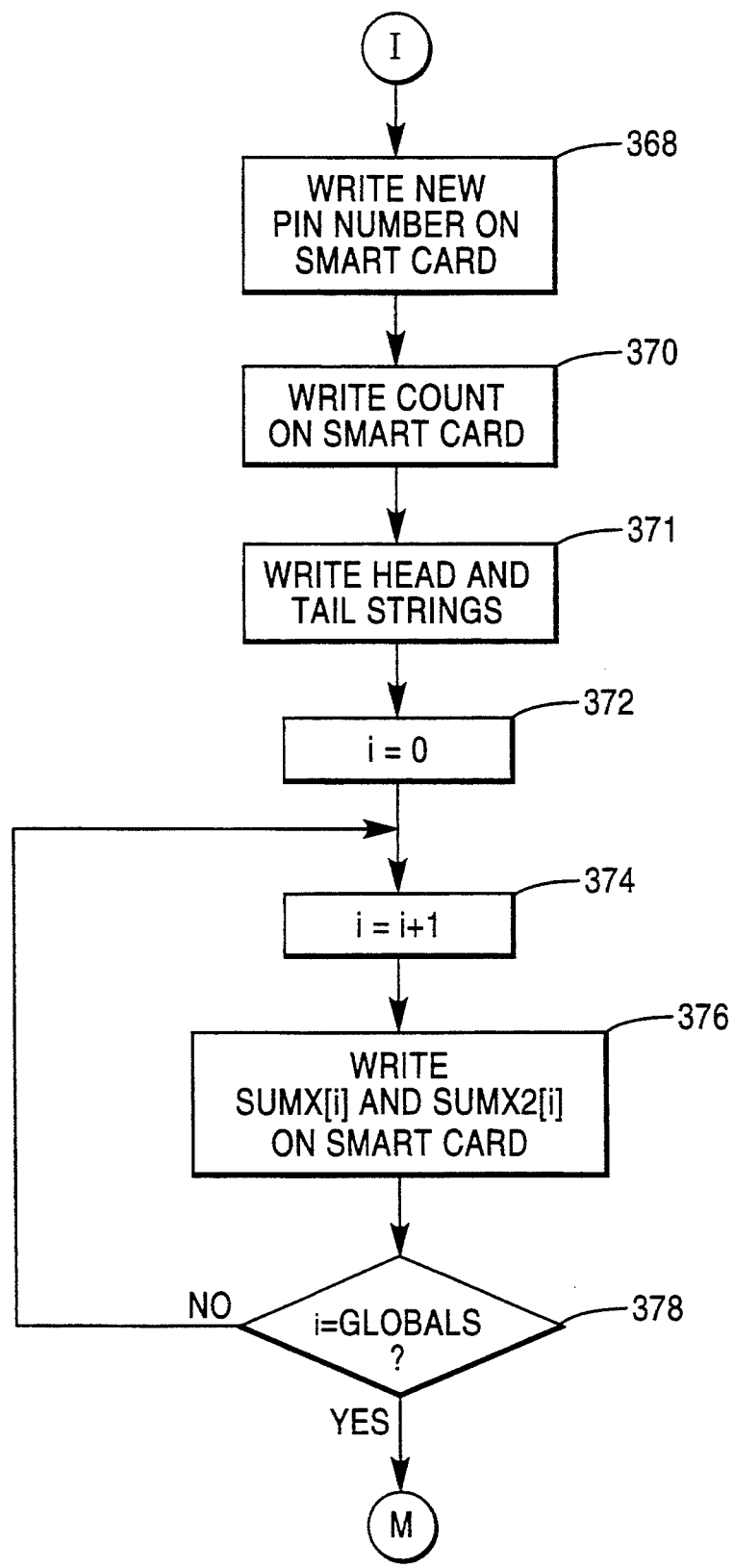
Figure 8F:
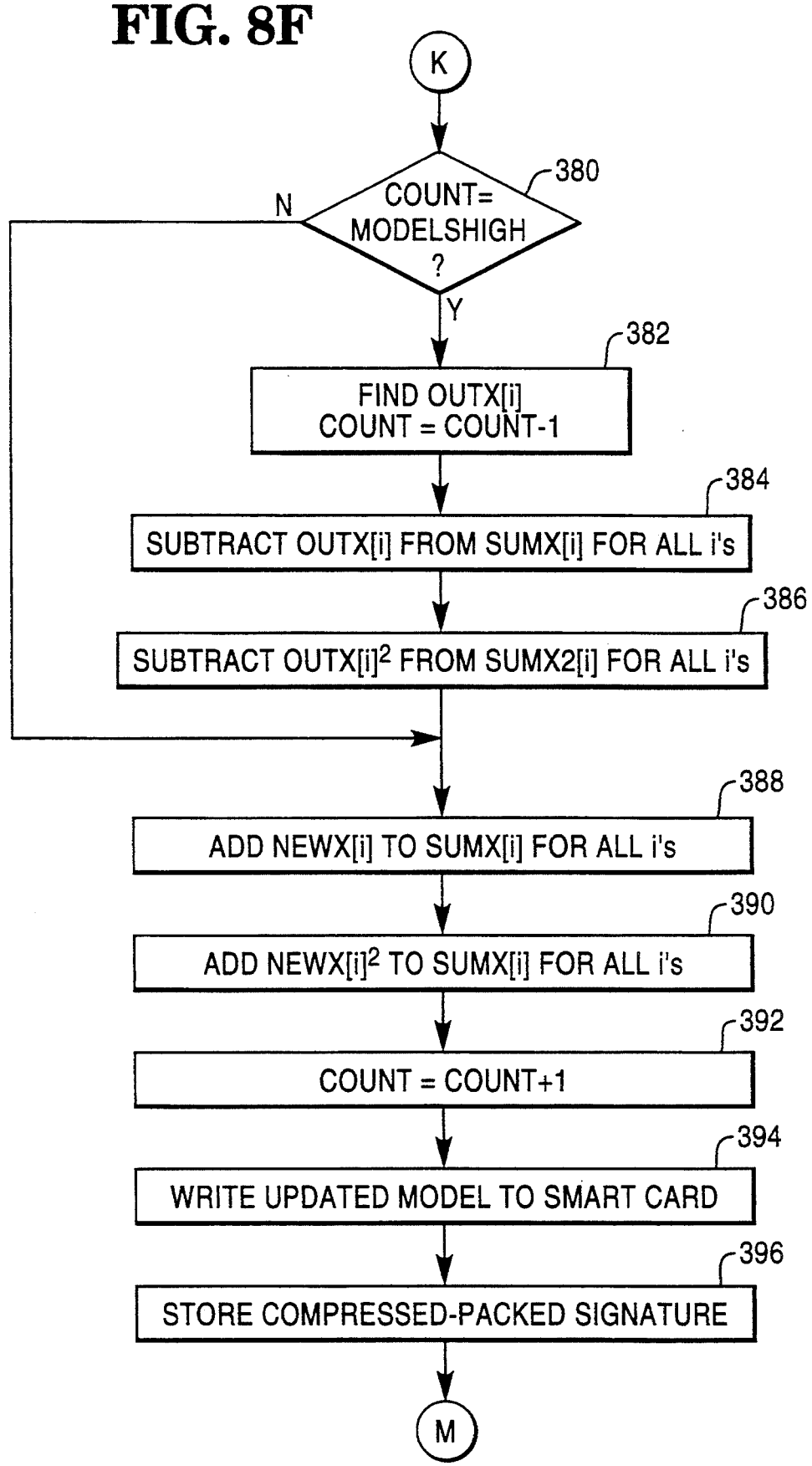

If the candidate signature passes the required tests, the method proceeds to block 380 of FIG. 8F, in which the method determines whether COUNT is equal to MODELSHIGH. If so, then an OUTX[i] value for each global variable must be selected to leave the model so that NEWX[i] values for each of the global variables may be included in the model.

Figure 9:
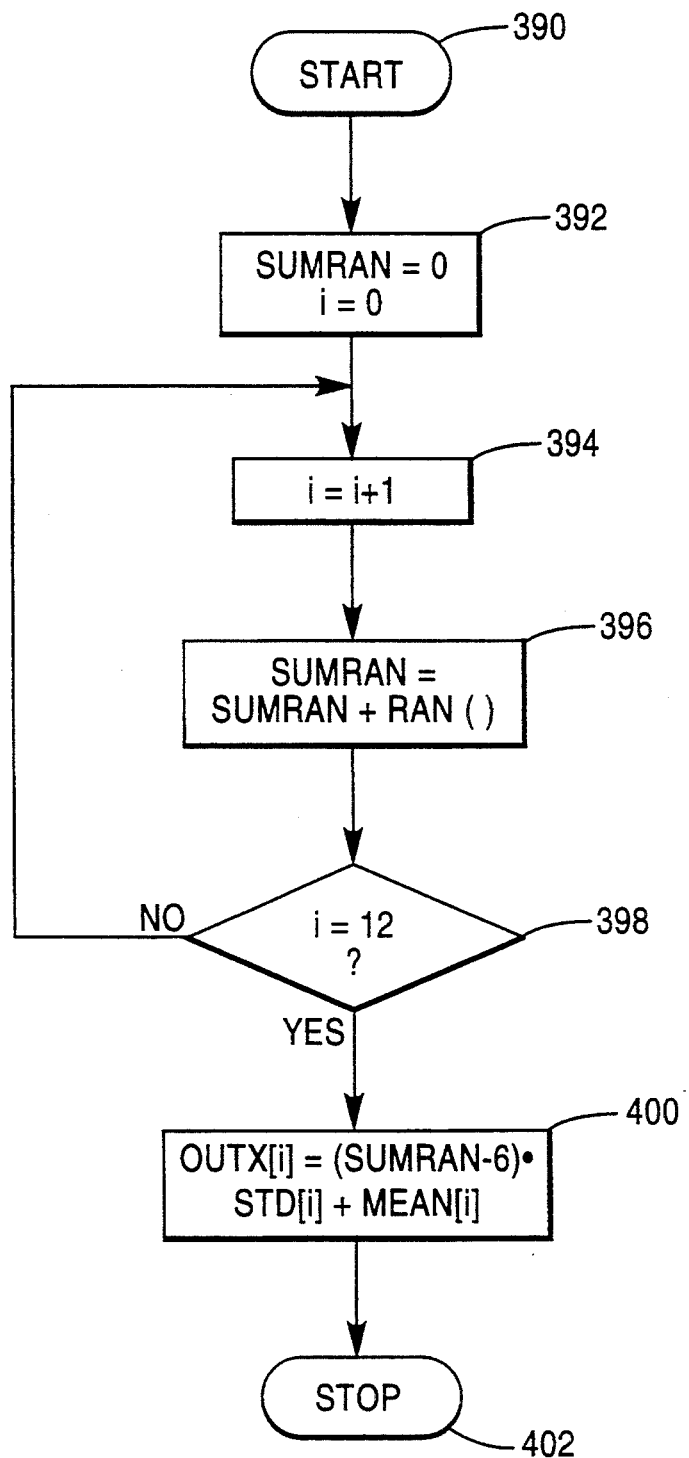
FIG. 9 is a flowchart describing a method for randomly selecting an x value based upon the assumption that a function f(x) is associated with a normal curve.

In block 382, an OUTX[i] value for each global variable is chosen using the method of FIG. 9 and the COUNT value is decremented by one.

In block 384, each SUMX[i] is decremented by the appropriate OUTX[i] variable value.

In block 386, each SUMX2[i] is decremented by the appropriate OUTX[i]$^2$ value. The method then proceeds to block 388.

If the inquiry in block 380 is false, the model is not decremented and the method proceeds to block 388.

In block 388, each SUMX[i] is incremented by the appropriate NEWX[i] variable value.

In block 390, each SUMX2[i] is incremented by the appropriate NEWX[i]$^2$ value.

In block 392, COUNT is incremented by one.

In block 394, the updated model is written to the SMART card.

In block 396, the new compressed-packed signature is stored in fixed disk 28.

The method then proceeds to block 311 of FIG. 8B, where the method terminates.

Returning back to block 290, if the result of the inquiry is true, then the user is a first time user, and transfer is made to block 340 in the flowchart of FIG. 8C where the construction of the first verification model is begun.

The execution of block 340 causes the loop variable i, governing the initialization of the pairs of sums associated with all the global verification variables, to be set to 0.

Next block 342 is executed, where the loop variable i is incremented by 1.

Box 344 is executed next and each verification pair of sums, SUMX[i] and SUMX2[i], are set to zero.

Then, an inquiry is made in block 346 to see if all the summation pairs have been set to zero. If the inquiry is false, then control returns to block 342 for another iteration of initialization. If the inquiry is true, then the initialization is finished and block 348 is executed next.

The execution in block 348 results in the loop variable COUNT, which indicates the number of signatures currently in the model, being set to 0.

Next in block 350, an inquiry is made to see whether the current signed signature should be incorporated into the initial model. If the result of the inquiry is true, then block 352 is executed.

The execution of block 352 causes the loop variable i, controlling the number of global variables, to be set to 0 and the count variable COUNT, denoting the number of signatures in the current model, is incremented by 1.

Next, block 354 is executed where each variable is incremented by 1 indicating the next pair of global variable sums is to be computed.

Continuing the sequential processing, block 356 is executed next and each of the two initial global variable sums are given values using the following two formulas:

$$SUMX[i] = SUMX[i] + NEWX[i]$$

$$SUMX2[i] = SUMX2[i] + NEWX[i]^2$$

Continuing the sequential execution, an inquiry at block 358 in FIG. 8D is made to see whether all the global verification values for the current signature in the new model have been processed. If the result of the inquiry is false, then control is returned back to block 354 so that the next global variable for the current signature can be used to increment the initial model's two sums. If the result of the inquiry is true, then each of the global variables is found.

In block 359, the head string HEAD[COUNT] and the tail string TAIL[COUNT] are obtained.

The execution of block 360 causes the current signature, whose global information has been incorporated as part of the initial model, to be stored on disk in the compressed-packed format.

Next, an inquiry at block 362 is done to see if the number of signatures in the current model, COUNT, equals the minimum number required in the current model (MODELSLOW). If the result of the inquiry is false, then block 364 is executed.

The execution of block 364 results in another signature being read and considered for possible incorporation into the first model. The signature is compressed using the method of FIG. 2.

Then, control is transferred back to block 350, where the candidate signature is either rejected or accepted for inclusion in the initial model.

Returning back to block 362, if the inquiry is true, then the initial model is constructed in memory, which includes the steps of determining the HEAD and TAIL strings, and block 368 in FIG. 8E is executed next.

In block 368, the PINNUMBER is modified to reflect that the initial model exists, and the pin number on the Smart Card is modified with this value.

Then, block 370 is executed and the count value COUNT is written to the Smart Card.

In block 371, the HEAD and TAIL strings are written to the SMART card.

Next, block 372 is executed and i is set to zero at the outset of the loop for writing the pairs of sums associated with the initial model's global verification values.

Then, the i variable is incremented by 1 in block 374.

Continuing, in block 376 each pair of global verification sums, SUMX[i] and SUMX2[i], are written on the Smart Card.

Following block 376, an inquiry is made at block 378 to see whether all of the initial model information has been written on the Smart Card. If the result of the inquiry is false, then block 374 is executed again as the next global variable pair of sums in the initial model are placed on the Smart Card. If the result of the inquiry is true, then the initial model has now been constructed on the Smart Card, and program control proceeds to block 311 where the program terminates.

The flowchart given in FIG. 9 gives the method for finding the OUTX[i] value, which was referred to earlier in block 382 in FIG. 8F. This particular value is needed when a new signature must be incorporated into a verification model already containing the maximum allowable number of signatures. Since, each global verification's standard deviation and mean assume the existence of a normal Gaussian curve, certain well-known algorithms exist for randomly selecting the OUTX[i] value. For example, the following transformation formula insures a new mean of 0 and a new standard deviation of 1, given the original mean (MEAN[i]), the original standard deviation (STD[i]), and the variable X.

$$Z = \frac{X - MEAN[i]}{STD[i]}$$

In this new form, the probability density function is:

$$f(Z) = \frac{1}{(2\pi)^{1/2}} \cdot e^{\frac{-Z^2}{2}}$$

Then, a value of X can be obtained randomly by using the following transformation formula:

$$X = Z \cdot STD[i] + MEAN[i]$$

In practice, the probability density function is approximated with a well-known summation method taken from the field of simulation. The basic idea of the method is to determine an approximate value for Z by summing up 12 pseudo-random real numbers in the range of 0 and 1. Then, the constant 6 is subtracted from this result.

Looking at FIG. 9, the method for selecting an OUTX[i] value begins at Start block 390.

The execution of block 392 initializes the summation variable SUMRAN to zero and the loop variable i is set to zero.

Next, block 394 is executed to increment the i loop variable by 1.

Then, the execution of block 396 causes the SUMRAN variable to be incremented by the next pseudo-random number value. Here, RAN() denotes a procedure to find randomly a real number value between 0 and 1. Such procedures are available in most common programming language environments.

An inquiry is then made in block 398 to see if the value of i equals 12. If the inquiry is false, then block 394 is executed again, since the summation of 12 random numbers has not yet been completed. If the inquiry at block 398 is true, then block 400 is executed.

The execution of block 400 computes the value of OUTX[i] using the following formula corresponding to the theory presented earlier.

$$OUTX[i] = (SUMRAN - 6.0) \cdot STD[i] + MEAN[i]$$

Following block 400, the procedure is completed at Stop 402.

Figure 10:
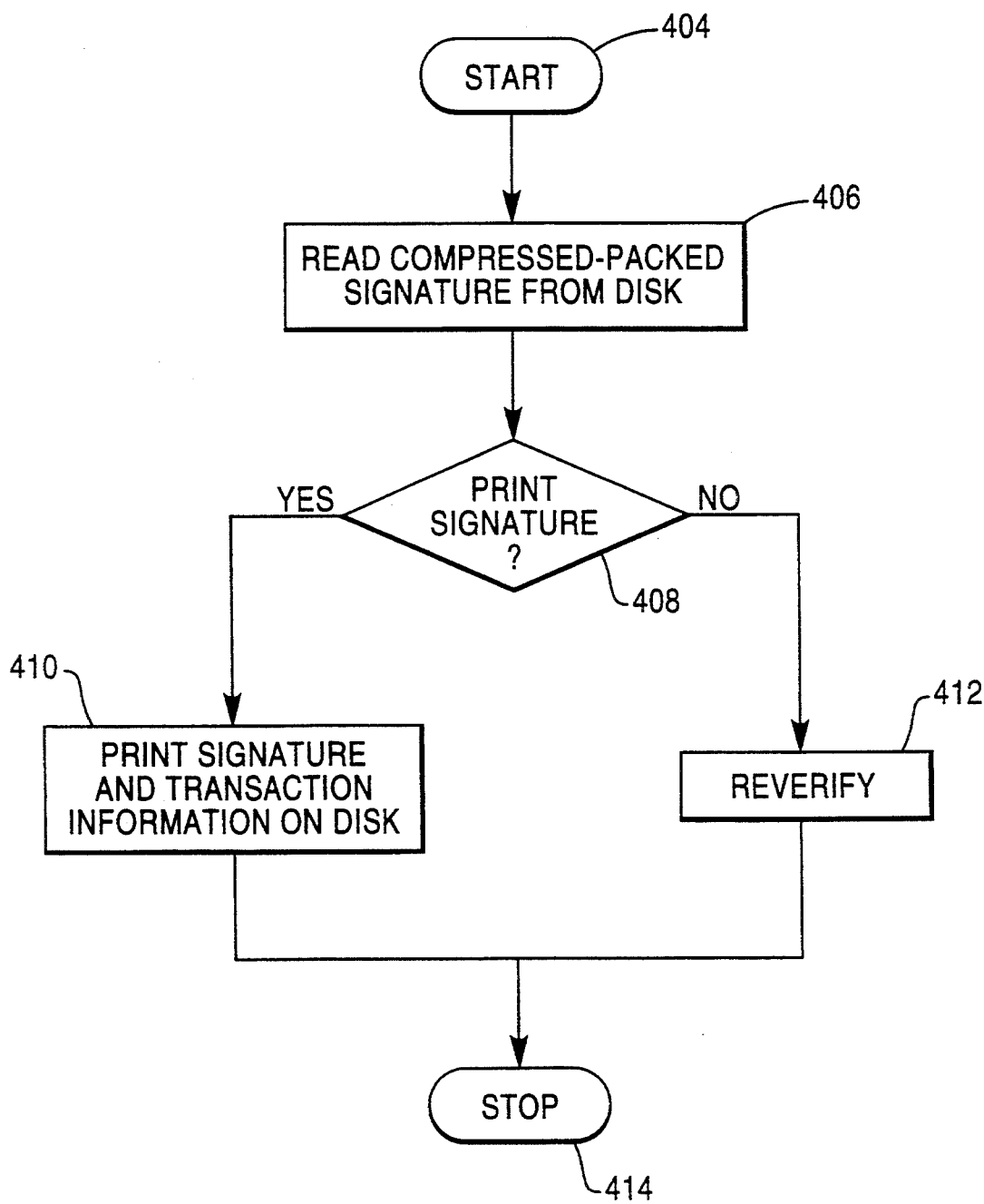
FIG. 10 is a flow diagram for retrieving a signature record that requires printing or reverification.

The flowchart of FIG. 10 is a general flowchart for retrieval of a compressed-packed signature. The general idea is to read a given signature from the fixed disk by some direct-access method. For example, a relational data base may be used to store and retrieve the compressed-packed signature. Then, the signature can be printed on a laser printer along with other transaction information, verified using the current dynamic model, or reverified once the initial model is reconstructed.

The FIG. 10 flowchart begins with Start 404.

In block 406, the compressed-packed signature is read.

An inquiry at block 408 is done to see if the signature is to be printed. If the result of the inquiry is true, then block 410 is executed.

The execution of block 410 causes the compressed-packed signature to be printed along with other transaction data.

After block 410 is executed, the procedure is terminated when block 414 is executed.

Returning to the inquiry at block 408. If the result of the inquiry is false, then the signature is reverified using either the current dynamic model or the original model. The method then terminates as program control is sent to Stop 414.

Although the present invention has been described with particular reference to certain preferred embodiments thereof, variations and modifications of the present invention can be effected within the spirit and scope of the following claims.

What is claimed is:

1. A method of verifying a handwritten signature entered into a digitizer comprising the steps of:
   (a) providing a handwriting capture device including the digitizer and a hand-held stylus for capturing the handwritten signature;
   (b) sensing the location of a series of signature points progressively traversed by the stylus during strokewise movement thereof by the digitizer for a plurality of signatures of a person;
   (c) generating a stream of digital position data from the analog position data from the digitizer for the plurality of signatures indicating the location of the signature points on the surface of the digitizer, pen down time, and total time to sign;
   (d) storing the position data in an ordered arrangement corresponding to the strokewise sequence of the data within the stream for the plurality of signatures;
   (e) retrieving the position data from storage in a sequence related to the storage order thereof for the plurality of signatures;
   (f) generating verification information including a count of the signatures, a sum of global variable values for the signatures, a sum of the squares of the global variable values for the signatures, and head and tail strings representing the average shape of the signatures by a processor coupled to the digitizer;
   (g) storing the verification information in a storage medium carried by the person;
   (h) determining a set of positional data points for a subsequent handwritten signature entered into the digitizer by a person;
   (i) determining a set of global variable values associated with the subsequent signature from the positional data points by the processor;
   (j) determining head and tail strings for the subsequent signature by the processor;
   (k) reading the head and tail strings from the storage medium carried by the person by the processor;
   (l) reading the verification information from the storage medium by the processor;
   (m) determining a range of acceptance values for each global variable by the processor;
   (n) determining whether each of the global verification values lies within the range of acceptance;
   (o) if at least one of the global verification values lies outside the range of acceptance, rejecting the subsequent signature as a forgery;
   (p) if each of the global verification values lies within the range of acceptance, determining whether the head and tail strings of the subsequent signature equal the head and tail strings from the storage medium;
   (q) if both of the head and tail strings of the subsequent signature are not equal to the head and tail strings from the storage medium, rejecting the subsequent signature as a forgery;
   (r) if either the head or the tail string of the subsequent signature are equal to the head or tail strings from the storage medium, accepting the signature as valid;
   (s) compressing and packing the subsequent signature by the processor, including the substeps of
      (s-1) retrieving the position data from storage in a sequence related to the storage order thereof;
      (s-2) computing the locations of the signature points relative to a series of strokewise oriented guide lines by the processor, wherein each guide line has two end points, including a start point and a stop point;
      (s-3) selecting only the position data corresponding to those of the signature points which do not fall within a rectangle about a corresponding guide line, the rectangle including a first line through the start point and perpendicular to the guide line, a second line through the stop point and perpendicular to the guide line, a third line on one side of the guide line and parallel to it, and a fourth line on the other side of the guide line and parallel to it;
      (s-4) determining delta values for each guide line, each delta value being represented by a predetermined number of bits less than the number of bits representing the end points;
      (s-5) discarding a predetermined number of lower bits from each delta value; and
      (s-6) readjusting each delta value to limit error propagation; and
   (t) storing the compressed-packed subsequent signature in another storage medium coupled to the processor.

2. The method as recited in claim 1, wherein step (j) comprises the substeps of:
- (j-1) establishing a vector between each data point of the subsequent signature by the processor;
- (j-2) assigning an integer direction value to each vector based upon the direction of the vectors;
- (j-3) forming a data word from the series of integer values;
- (j-4) representing a first series of like direction values from the beginning of the data word to a predetermined position in the data word by a single one of the like direction values to form the head string; and
- (j-5) representing a second series of like direction values from a position after the predetermined position to the end of the data word by a single one of the like direction values to form the tail string.

3. The method as recited in claim 1, wherein step (m) comprises the substeps of:
- (m-1) reading the sum of the global variable values, the sum of the squares of the global variable values, and the count of signatures from the storage medium;
- (m-2) determining the mean MEAN[i] and standard deviation STD[i] of the global variable values;
- (m-3) determining a minimum acceptance value using the formula $$MIN[i]=MIN([MULT1[i] \cdot STD[i]-DECR[i], MULT2[i] \cdot MEAN[i]);$$

and
- (m-4) determining a maximum acceptance value using the formula $$MAX[i]=MAX(MULT3[i] \cdot STD[i]+INCR[i], MULT4[i] \cdot MEAN[i]).$$

4. The method as recited in claim 1, wherein step (t) comprises the substeps of:
- (t-1) storing one of the end points and a corresponding readjusted delta value for each guide line.

5. The method as recited in claim 1, wherein the storage medium carried by the person comprises a SMART card.

* * * * *